United States Patent
Sato et al.

(10) Patent No.: US 10,873,783 B2
(45) Date of Patent: Dec. 22, 2020

(54) INFORMATION PROCESSING APPARATUS, INFORMATION PROCESSING METHOD, RECEIVING APPARATUS, AND RECEIVING METHOD

(71) Applicant: Sony Corporation, Tokyo (JP)

(72) Inventors: Masahiko Sato, Kanagawa (JP); Hideo Nagasaka, Kanagawa (JP)

(73) Assignee: Sony Corporation (JP)

( * ) Notice: Subject to any disclaimer, the term of this patent is extended or adjusted under 35 U.S.C. 154(b) by 150 days.

(21) Appl. No.: 15/774,802

(22) PCT Filed: Nov. 11, 2016

(86) PCT No.: PCT/JP2016/083475
§ 371 (c)(1),
(2) Date: May 9, 2018

(87) PCT Pub. No.: WO2017/090459
PCT Pub. Date: Jun. 1, 2017

(65) Prior Publication Data
US 2020/0014977 A1  Jan. 9, 2020

(30) Foreign Application Priority Data
Nov. 27, 2015 (JP) .................................. 2015-231256

(51) Int. Cl.
*H04N 5/445* (2011.01)
*H04N 21/462* (2011.01)
(Continued)

(52) U.S. Cl.
CPC ... *H04N 21/4622* (2013.01); *H04N 21/47205* (2013.01); *H04N 21/4821* (2013.01); *H04N 21/8586* (2013.01)

(58) Field of Classification Search
CPC ......... H04N 21/4622; H04N 21/47205; H04N 21/4821; H04N 21/8586; H04N 21/4126;
(Continued)

(56) References Cited

U.S. PATENT DOCUMENTS

| 7,500,195 B2* | 3/2009 | Sahota ................. G06F 16/958 715/733 |
| 7,543,325 B2* | 6/2009 | Westbrook ............... H04N 5/76 725/93 |

(Continued)

FOREIGN PATENT DOCUMENTS

| JP | 2001086421 A | 3/2001 |
| JP | 2002-044536 A | 2/2002 |

(Continued)

OTHER PUBLICATIONS

International Search Report corresponding to PCT/JP2016/083475, dated Feb. 14, 2017 (2 pgs.).

(Continued)

*Primary Examiner* — Michael B. Pierorazio
(74) *Attorney, Agent, or Firm* — Lerner, David, Littenberg, Krumholz & Mentlik, LLP

(57) ABSTRACT

The present technology relates to an information processing apparatus, an information processing method, a receiving apparatus, and a receiving method that aim at enabling a desired content to be viewed by a simpler operation.

A server assigns a predetermined channel of a television receiver to a predetermined URL, associates a content specified by a predetermined electronic device with the URL, receives a request for the content associated with the URL from the television receiver in response to a selection of the channel in the television receiver, and controls the content to be distributed to the television receiver in response to the request. The television receiver receives the selection of the channel to which the URL is assigned by the (Continued)

server, transmits a request for the content to the server in response to the selection of the channel, and receives the content distributed in response to the request.

20 Claims, 24 Drawing Sheets

(51) Int. Cl.
  *H04N 21/472* (2011.01)
  *H04N 21/482* (2011.01)
  *H04N 21/858* (2011.01)
(58) Field of Classification Search
  CPC . H04N 21/2385; H04N 21/274; H04N 21/482
  USPC .......................................................... 725/39
  See application file for complete search history.

(56) References Cited

U.S. PATENT DOCUMENTS

| | | | | |
|---|---|---|---|---|
| 8,544,049 | B2* | 9/2013 | Kamimaki | H04N 21/4348 725/105 |
| 8,639,084 | B2* | 1/2014 | Seo | G11B 27/105 386/200 |
| 8,731,301 | B1* | 5/2014 | Bushman | G06K 9/2063 235/375 |
| 2002/0042925 | A1 | 4/2002 | Ebisu et al. | |
| 2002/0129368 | A1* | 9/2002 | Schlack | G06Q 30/02 725/46 |
| 2003/0154492 | A1 | 8/2003 | Falvo et al. | |
| 2003/0182242 | A1* | 9/2003 | Scott | G06Q 20/12 705/65 |
| 2004/0093505 | A1* | 5/2004 | Hatakeyama | G06F 21/12 713/189 |
| 2004/0123313 | A1* | 6/2004 | Koo | H04N 7/163 725/31 |
| 2007/0033282 | A1* | 2/2007 | Mao | H04N 21/2181 709/226 |
| 2007/0067808 | A1* | 3/2007 | DaCosta | H04N 7/17318 725/62 |
| 2007/0124775 | A1* | 5/2007 | DaCosta | H04H 60/372 725/62 |
| 2007/0186270 | A1 | 8/2007 | Kang et al. | |
| 2007/0242829 | A1* | 10/2007 | Pedlow, Jr. | H04N 7/162 380/277 |
| 2007/0286215 | A1* | 12/2007 | Morris | H04W 76/38 370/401 |
| 2008/0098464 | A1* | 4/2008 | Mizrah | G06F 21/36 726/5 |
| 2008/0141313 | A1* | 6/2008 | Kato | H04N 7/1675 725/62 |
| 2008/0219436 | A1* | 9/2008 | Chen | H04N 7/162 380/30 |
| 2009/0138922 | A1* | 5/2009 | Thomas | H04N 21/42204 725/87 |
| 2009/0183196 | A1* | 7/2009 | Chen | H04L 63/062 725/31 |
| 2009/0293083 | A1* | 11/2009 | Gordon | H04N 7/162 725/25 |
| 2009/0320077 | A1* | 12/2009 | Gazdzinski | H04N 7/17318 725/62 |
| 2010/0070759 | A1* | 3/2010 | Leon Cobos | H04L 63/0853 713/155 |
| 2010/0115591 | A1* | 5/2010 | Kane-Esrig | G06F 21/34 726/5 |
| 2010/0175102 | A1* | 7/2010 | Kuang | G08C 17/00 725/141 |
| 2010/0287057 | A1* | 11/2010 | Aihara | G06K 7/1095 705/16 |
| 2010/0299264 | A1* | 11/2010 | Berger | G06Q 30/06 705/59 |
| 2011/0022665 | A1* | 1/2011 | Pinto | H04L 61/20 709/206 |
| 2011/0022666 | A1* | 1/2011 | Pinto | G06F 13/4247 709/206 |
| 2011/0093883 | A1* | 4/2011 | Sun | H04N 7/1675 725/31 |
| 2011/0289537 | A1* | 11/2011 | Buehl | H04N 21/4223 725/98 |
| 2012/0124618 | A1* | 5/2012 | Ruiz-Velasco | G06Q 30/0241 725/32 |
| 2012/0325899 | A1* | 12/2012 | Willemen | B23K 3/0653 228/203 |
| 2013/0157760 | A1* | 6/2013 | Boudville | G06K 7/12 463/31 |
| 2013/0291041 | A1* | 10/2013 | Cheung | H04N 21/435 725/110 |
| 2013/0298155 | A1* | 11/2013 | Stepanov | H04N 21/2541 725/31 |
| 2015/0256824 | A1* | 9/2015 | Ramachandran | H04N 21/6582 725/131 |

FOREIGN PATENT DOCUMENTS

| | | |
|---|---|---|
| JP | 2008219842 A | 9/2008 |
| JP | 2009100006 A | 5/2009 |

OTHER PUBLICATIONS

Supplementary European Search Report for EP16868407 dated Aug. 8, 2018.
Office Action for Chinese Application No. 2016800676399 dated May 6, 2020; 8 pages.
Japanese Office Action for Application No. 2017552358 dated Aug. 13, 2020; 3 pages.

* cited by examiner

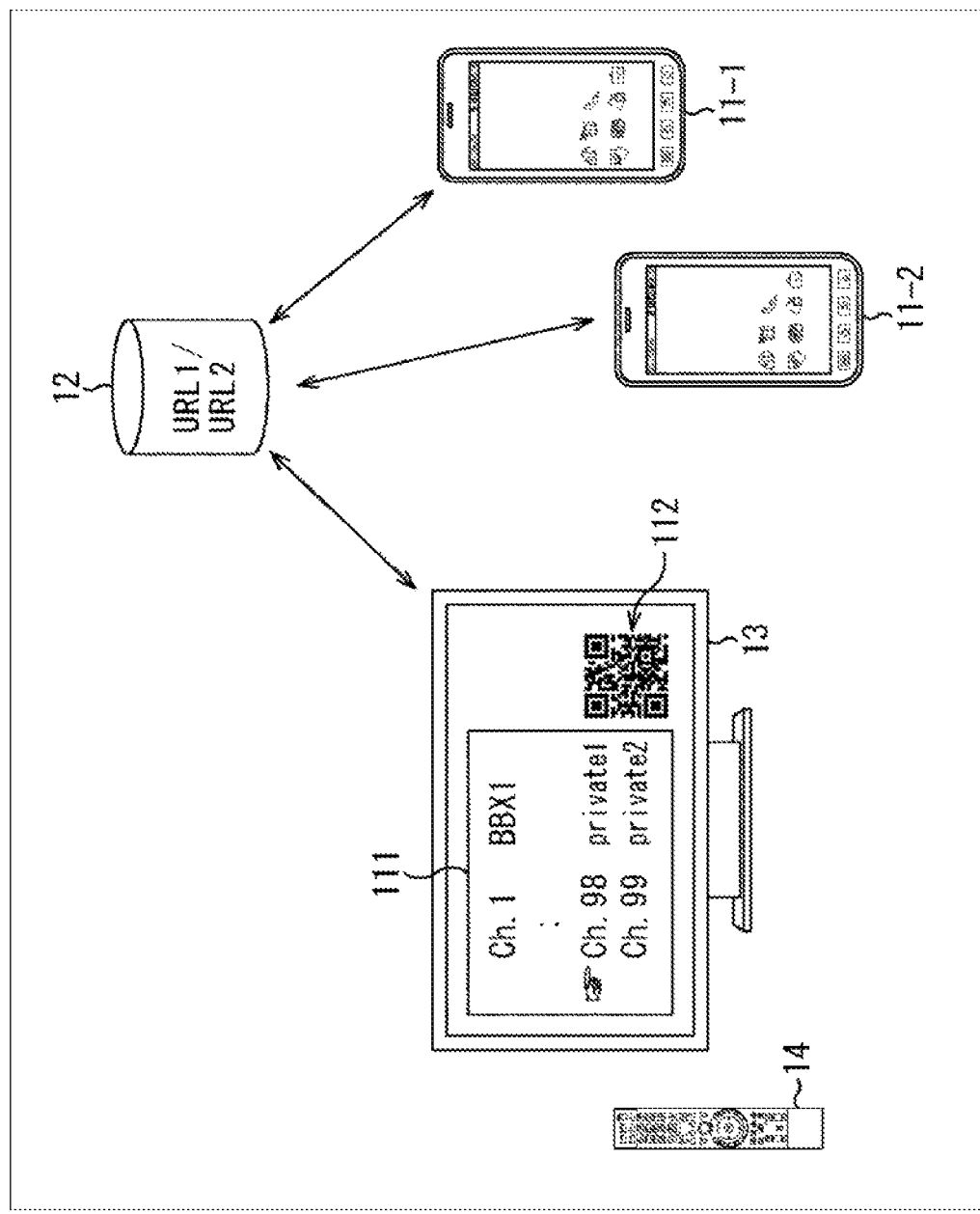

F I G . 1 3

| channel | 7pm | 7:30pm | 8pm | 8:30pm | 9pm | 9:30pm | 10pm | 10:30pm |
|---|---|---|---|---|---|---|---|---|
| 1 [BBC one] | The ONE Show | | Don't Tell the Bride | | The Interceptor | | BBC News at Ten | SunTrap |
| 2 [TWO] | Tennis: Wimbledon 2015 | | | Wimbledon 2day | | The BBC Hampton Court Palace Flower Show | | Newsnight |
| 3 [itv] | Emmerdale | Coronation Street | The Cube | | Long Lost Family | | ITV News at Ten & Weather | The Ref... |
| 4 | Channel 4 News | | The Auction House | | 24 Hours in A&E | | Kids in Crisis | |
| 5 | The 15-Year-Old Snapchatie... and Other Big Spending Kids | | 90 Cats & Counting:Cat Crazies | | Nightmare Tenants, Slum Landlords | | Big Brother | |
| 98 [brother's channel] | PHOTO OF CAT | PHOTO OF DOG | PHOTO OF RABBIT ← 121 | | | | | |
| 99 [sister's channel] | PHOTO OF SEA | PHOTO OF MOUNTAIN | PHOTO OF DISH ← 122 | | | | | |

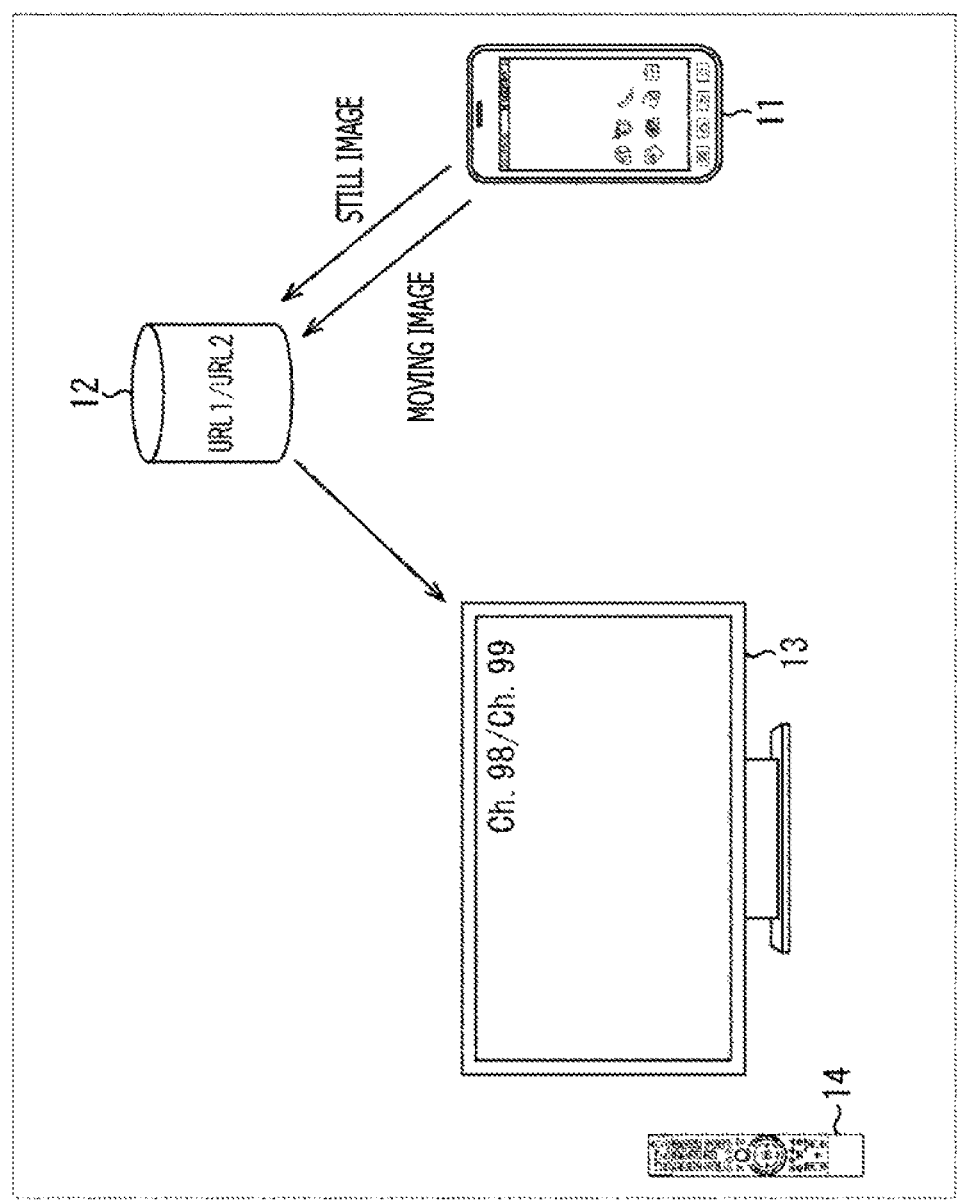

FIG. 17

| channel | 7pm | 7:30pm | 8pm | 8:30pm | 9pm | 9:30pm | 10pm | 10:30pm |
|---|---|---|---|---|---|---|---|---|
| 1 (one) | The ONE Show | | Don't Tell the Bride | | The Interceptor | | BBC News at Ten | BBC Lon News / SunTrap |
| 2 (TWO) | Tennis: Wimbledon 2015 | | | Wimbledon 2day | | The RHS Hampton Court Palace Flower Show | | Newsnight |
| 3 (itv) | Emmerdale | Coronation Street | The Cube | | Long Lost Family | | ITV News at Ten & Weather | The Refu... |
| 4 | Channel 4 News | | The Auction House | | 24 Hours in A&E | | Kids in Crisis | |
| 5 | The 15-Year-Old Shopaholic... and Other Big Spending Kids | | 90 Cats & Counting: Cat Crazies | | Nightmare Tenants, Slum Landlords | | Big Brother | |
| 98 (my photo) | PHOTO OF CAT | PHOTO OF DOG | PHOTO OF RABBIT | | | | | ←151 |
| 99 (my video) | VIDEO OF SEA | VIDEO OF MOUNTAIN | VIDEO OF DISH | | | | | ←152 |

FIG. 22

| channel | | 7am | 7:30pm | 8am | 8:30am | 9pm | 9:30pm | 10am | 10:30pm |
|---|---|---|---|---|---|---|---|---|---|
| 0 | my channel | PHOTO OF CAT | PHOTO OF DOG | PHOTO OF RABBIT ← 181 | | | | | |
| 1 | BBC one | The ONE Show | | Don't Tell the Bride | | The Interceptor | | BBC News at Ten | BBC Lon News / SunTrap |
| 2 | BBC TWO | Tennis:Wimbledon 2015 | Coronation Street | | Wimbledon 2day | | The RHS Hampton Court Palace Flower Show | | Newsnight |
| 3 | itv | Emmerdale | | The Cube | The Auction House | Long Lost Family | | ITV News at Ten & Weather | The Mafia |
| 4 | 4 | Channel 4 News | | | | 24 Hours in A&E | | Kids in Crisis | |
| 5 | 5 | The 12-Year-Old Shopaholic... and Other Big Spending Kids | | 90 Cats & Counting:Cat Crazies | | Nightmare Tenants,Slum Landlords | | Big Brother | |

INFORMATION PROCESSING APPARATUS, INFORMATION PROCESSING METHOD, RECEIVING APPARATUS, AND RECEIVING METHOD

CROSS-REFERENCE TO RELATED APPLICATIONS

This application is a national phase entry under 35 U.S.C. § 371 of International Application No. PCT/JP2016/083475 filed Nov. 11, 2016, which claims the priority from Japanese Patent Application No. 2015-231256 filed in the Japanese Patent Office on Nov. 27, 2015, the entire contents of which are hereby incorporated by reference.

TECHNICAL FIELD

The present technology relates to an information processing apparatus, an information processing method, a receiving apparatus, and a receiving method, and more particularly relates to an information processing apparatus, an information processing method, a receiving apparatus, and a receiving method that aim at enabling a desired content to be viewed.

BACKGROUND ART

PTL 1 discloses that activation of a browser is assigned to an unused channel of a television receiver. This process permits a Web page to be readily viewed.

CITATION LIST

Patent Literature

[PTL 1]
JP 2002-44536A

SUMMARY

Technical Problems

Meanwhile, in recent years, a content has been shared between a mobile device and a television receiver by using a predetermined streaming protocol.

In this case, a user has no choice but to perform a predetermined operation near the television receiver and view the content on the spot, and cannot bookmark a content found in a place the user has visited to and view the content afterward.

In addition, a content has also been shared between devices by the devices logging in to a predetermined video contribution site.

In this case, troublesome operations are required for the user, such as a log-in operation is necessary, or different operations are performed for different applications for viewing the content.

The present technology has been made in view of the circumstances as described above and aims at enabling a desired content to be viewed by a simpler operation.

Solution to Problems

An information processing apparatus of the present technology includes an assignment unit configured to assign a predetermined channel of a television receiver to predetermined specific information; an association unit configured to associate at least one content specified by a predetermined electronic device or a predetermined user with the specific information; a receiving unit configured to receive a request for the content associated with the specific information from the television receiver in response to a selection of the channel in the television receiver; and a distribution control unit configured to control the content to be distributed to the television receiver in response to the request.

An information processing method of the present technology includes the steps of: assigning a predetermined channel of a television receiver to predetermined specific information; associating at least one content specified by a predetermined electronic device or a predetermined user with the specific information; receiving a request for the content associated with the specific information from the television receiver in response to a selection of the channel in the television receiver; and controlling the content to be distributed to the television receiver in response to the request.

In the information processing apparatus and the information processing method of the present technology, a predetermined channel of a television receiver is assigned to predetermined specific information; at least one content specified by a predetermined electronic device or a predetermined user and the specific information are associated; a request for the content associated with the specific information is received from the television receiver in response to a selection of the channel in the television receiver; and the content is controlled to be distributed to the television receiver in response to the request.

A receiving apparatus of the present technology includes: a selection receiving unit configured to receive a selection of a predetermined channel to which predetermined specific information is assigned by a predetermined information processing apparatus; a transmitting unit configured to transmit a request for at least one content specified by a predetermined electronic device or a predetermined user, the content being associated with the specific information by the information processing apparatus, to the information processing apparatus in response to the selection of the channel; and a receiving unit configured to receive the content distributed in response to the request.

A receiving method of the present technology includes the steps of: receiving a selection of a predetermined channel to which predetermined specific information is assigned by a predetermined information processing apparatus; transmitting a request for at least one content specified by a predetermined electronic device or a predetermined user, the content being associated with the specific information by the information processing apparatus, to the information processing apparatus in response to the selection of the channel; and receiving the content distributed in response to the request.

In the receiving apparatus and the receiving method of the present technology, a selection of a predetermined channel to which predetermined specific information is assigned by a predetermined information processing apparatus is received; a request for at least one content specified by a predetermined electronic device or a predetermined user, the content being associated with the specific information by the information processing apparatus, is transmitted to the information processing apparatus in response to the selection of the channel; and the content distributed in response to the request is received.

Advantageous Effect of Invention

According to an embodiment of the present technology, it is possible to view a desired content by a simpler operation.

BRIEF DESCRIPTION OF DRAWINGS

FIG. 12 is a diagram describing the link between the mobile device and the television receiver.

FIG. 13 is a diagram illustrating an example of an EPG displayed in the television receiver.

FIG. 14 is a diagram describing a flow of the distribution of the content.

FIG. 17 is a diagram illustrating an example of the EPG displayed in the television receiver.

FIG. 22 is a diagram illustrating an example of the EPG displayed in the television receiver.

DESCRIPTION OF EMBODIMENT

Hereinafter, an embodiment of the present technology will be described with reference to the accompanying drawings.

<Configuration Example of Content Distribution System>

Figure 1:
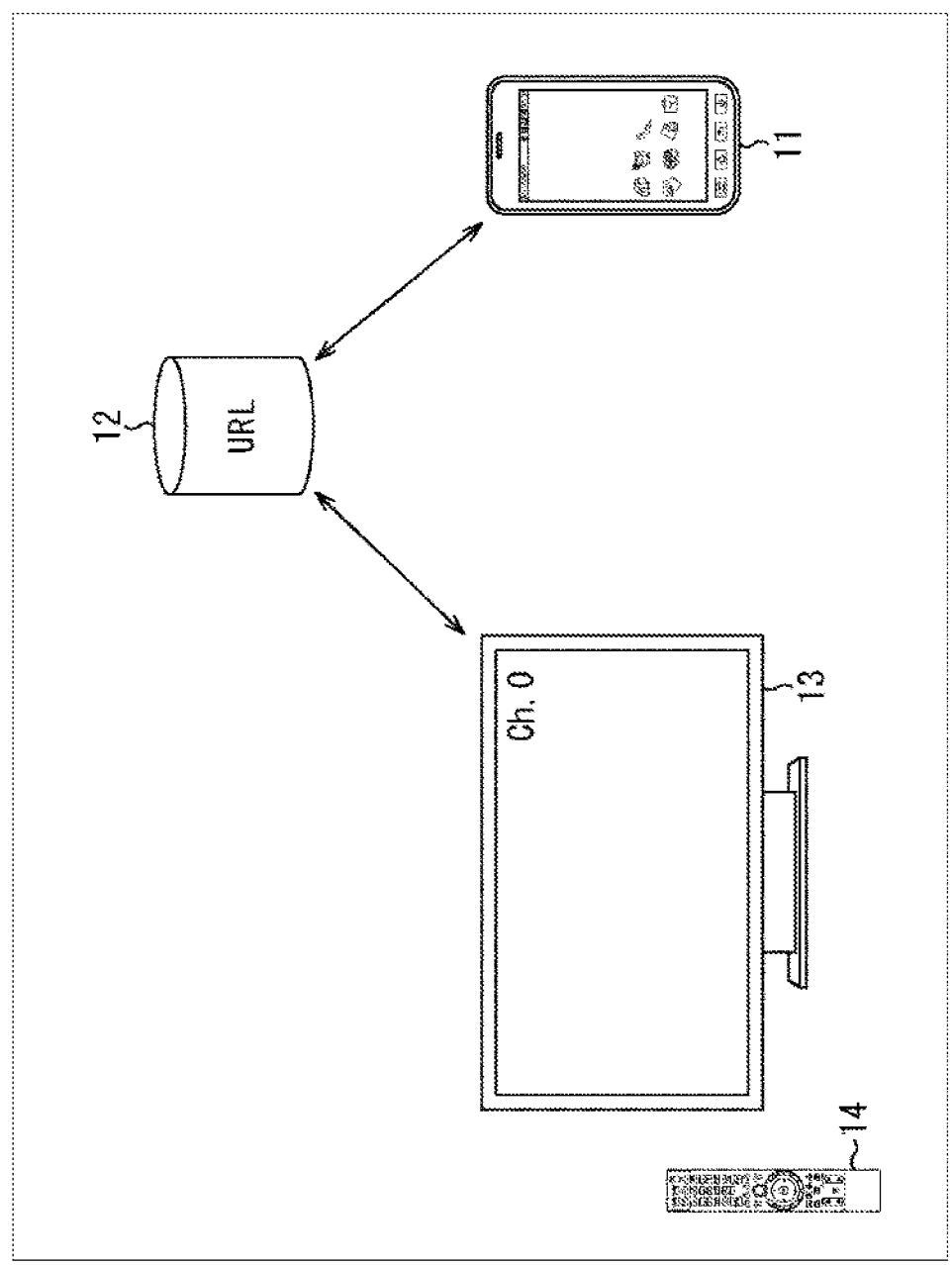
FIG. 1 is a diagram illustrating a configuration example of a content distribution system to which the present technology is applied.

FIG. 1 illustrates a configuration example of a content distribution system to which the present technology is applied.

The content distribution system illustrated in FIG. 1 includes a mobile device 11, a server 12, a television receiver 13, and a remote commander 14. Here, the same user is assumed to possess the mobile device 11 and the television receiver 13, but it is also possible that one user possesses the mobile device 11 and another user possesses the television receiver 13.

The mobile device 11 is a portable electronic device. Examples of the mobile device 11 include a portable telephone such as a smartphone, a tablet terminal, and the like.

The server 12 is connected to the mobile device 11 and the television receiver 13 via a network such as the Internet.

The television receiver 13 receives television broadcasting of a channel selected by the user and thereby displays videos of a corresponding television broadcast program and at the same time outputs voices.

The remote commander 14 has buttons and the like for selecting channels of the television broadcasting. The user can operate the buttons of the remote commander 14 to thereby select the channel of the television broadcasting. This process permits the user to view a desired television broadcast program.

Further, in the content distribution system illustrated in FIG. 1, from among the channels of the television broadcasting, the user can view a content specified by the mobile device 11 by using a channel (unused channel) that is not used for the television broadcasting.

Figure 2:
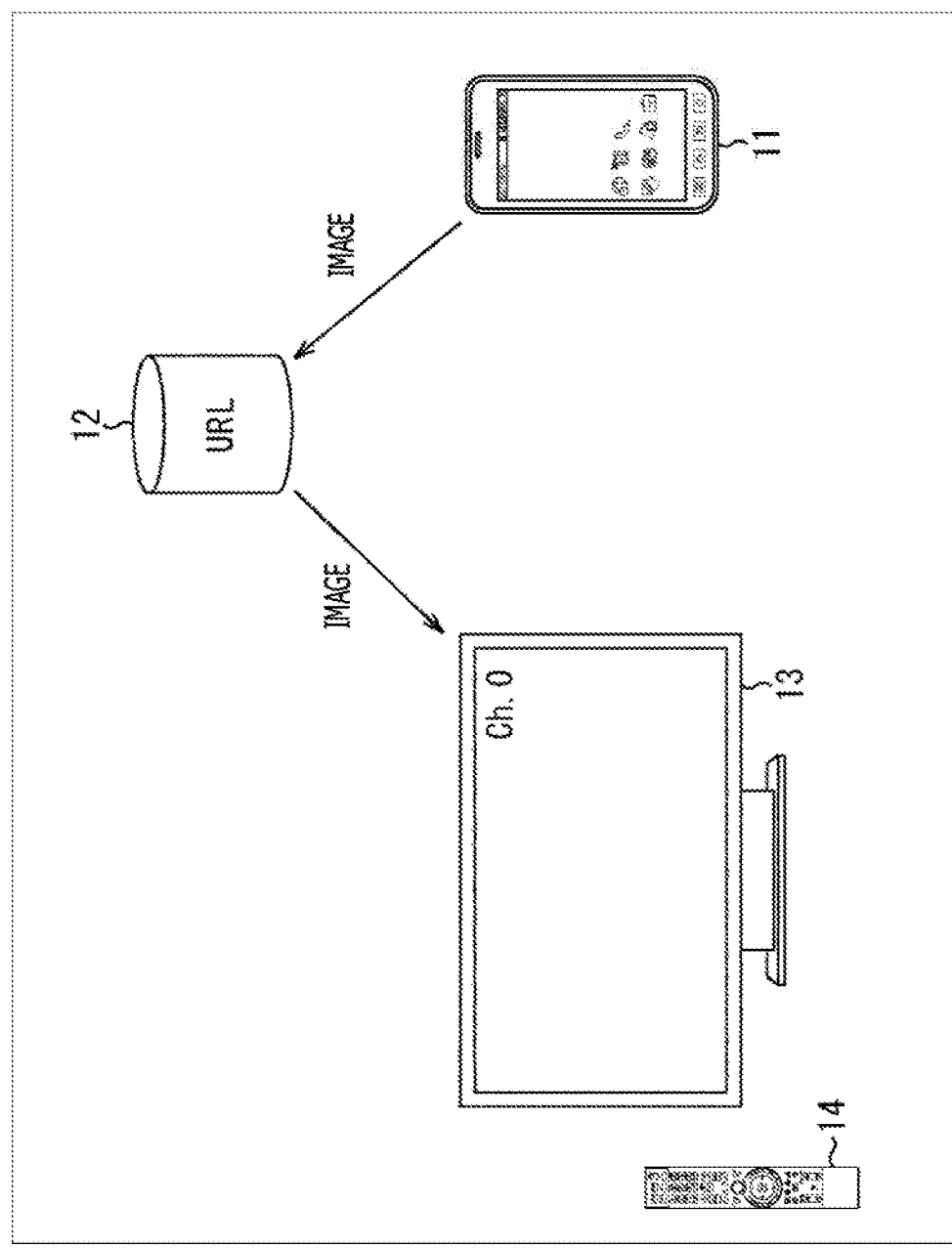
FIG. 2 is a diagram describing a flow of distribution of a content.

To a predetermined URL (Uniform Resource Locator) in the server 12, for example, the unused channel that is not used for the television broadcasting in the television receiver 13, for example, a channel 0 (Ch. 0) is assigned. In addition, as illustrated in FIG. 2, an image (still image) photographed by a camera function of the mobile device 11 is uploaded to the predetermined URL in the server 12. In the case where the Ch. 0 is selected in the television receiver 13, the image uploaded to the predetermined URL in the server 12 is distributed to the television receiver 13. The series of processes are realized by linking the mobile device 11 and the television receiver 13 together by using a predetermined method.

Through the above-described configuration, the user can operate the buttons of the remote commander 14 and select the Ch. 0 to thereby view the image photographed using the mobile device 11 by the television receiver 13.

Note that the content distribution system to which the present technology is applied is not limited to the above-described configuration in which the content is specified by the mobile device 11 and can also adopt a configuration in which the content is specified by a predetermined user. For example, the user may log in to a predetermined video contribution site by using a unique user ID and specify a predetermined content (moving image) in the video contribution site.

Through the above-described configuration, by operating the buttons of the remote commander 14 and selecting the Ch. 0, the user can view moving images retrieved or contributed by himself/herself by the television receiver 13.

<Functional Configuration Example of Server>

Figure 3:
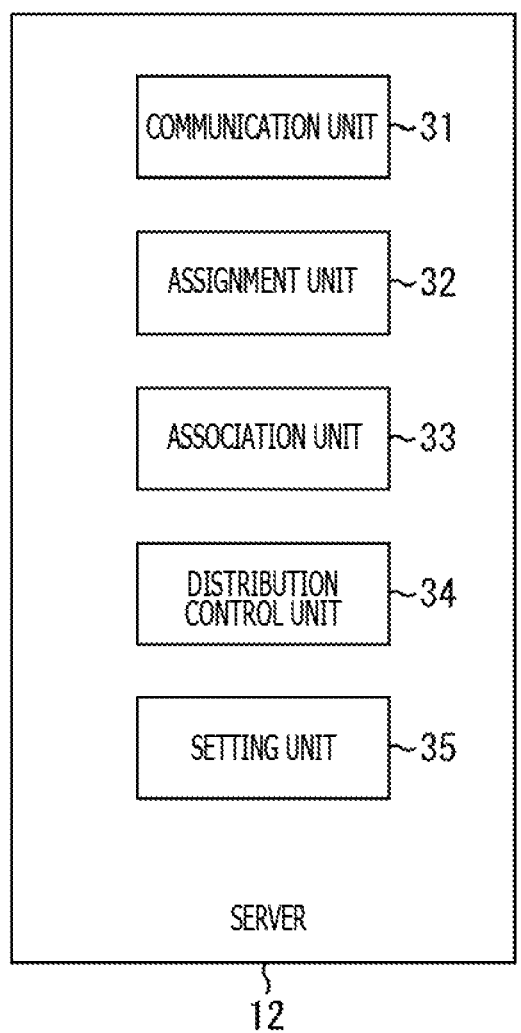
FIG. 3 is a block diagram illustrating a functional configuration example of a server.

Next, a functional configuration example of the server 12 will be described with reference to FIG. 3.

The server 12 includes a communication unit 31, an assignment unit 32, an association unit 33, a distribution control unit 34, and a setting unit 35.

The communication unit 31 performs communication with the mobile device 11 and the television receiver 13 via the network such as the Internet.

On the basis of the communication with the television receiver 13, the assignment unit 32 assigns an unused channel (for example, the Ch. 0) that is not used for the television broadcasting in the television receiver 13 to predetermined specific information. The specific information here is information for specifying a resource and is, for example, a predetermined URL, a predetermined ID, or the like. Note that the predetermined URL may be a URL for specifying a resource in the server 12 or a URL for specifying a predetermined resource in WWW (World Wide Web). Hereinafter, the specific information will be described as the predetermined URL.

On the basis of the communication with the mobile device 11, the association unit 33 associates at least one content (concretely, content for which uploading is instructed) specified by the mobile device 11 with the predetermined URL. That is, one content and the predetermined URL may be associated with each other and a plurality of contents and the predetermined URL may be associated with each other.

To the predetermined URL, the content specified by the mobile device 11 is to be uploaded. Here, when the Ch. 0 is selected in the television receiver 13, the communication unit 31 receives a request for the content uploaded to the predetermined URL from the television receiver 13.

In response to the request from the television receiver 13, the distribution control unit 34 controls the content uploaded to the predetermined URL to be distributed to the television receiver 13.

In the case where a plurality of contents are specified by the mobile device 11, the setting unit 35 sets the priority at the time when those contents are distributed.

<Functional Configuration Example of Television Receiver>

Figure 4:
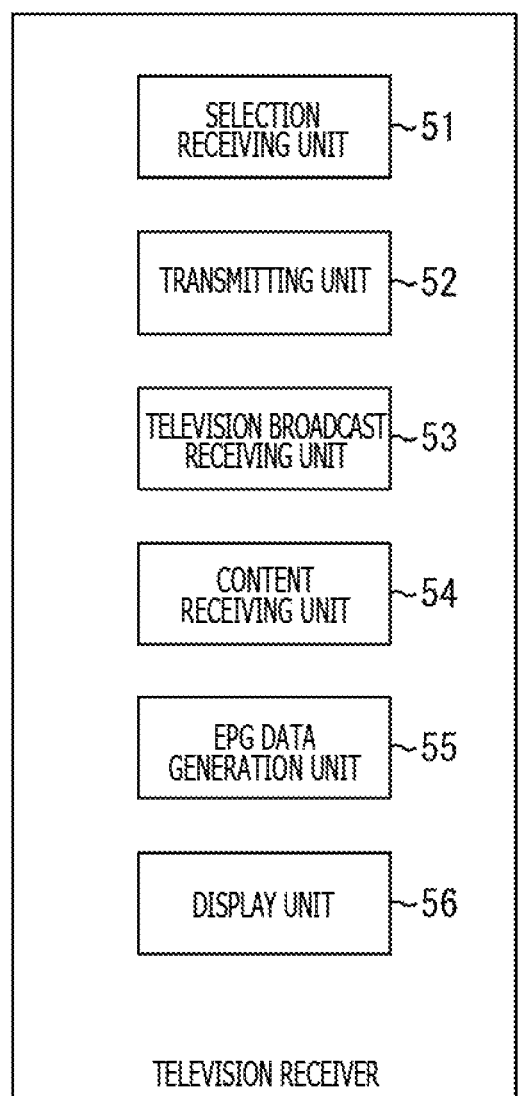
FIG. 4 is a block diagram illustrating a functional configuration example of a television receiver.

Next, the functional configuration example of the television receiver 13 will be described with reference to FIG. 4.

The television receiver 13 includes a selection receiving unit 51, a transmitting unit 52, a television broadcast receiving unit 53, a content receiving unit 54, an EPG data generation unit 55, and a display unit 56.

When a button for selecting a channel of the television broadcasting is operated in the remote commander 14, the selection receiving unit 51 receives the selection of the channel.

When a selection of an unused channel (for example, the Ch. 0) that is not used for the television broadcasting is received, the transmitting unit 52 transmits to the server 12 the request for the content associated with the predetermined specific information (predetermined URL) by the server 12, the content being at least one content specified by the mobile device 11 (or the predetermined user).

When the selection of a channel used for the television broadcasting is received, the television broadcast receiving unit 53 receives the television broadcasting of the channel.

The content receiving unit 54 receives the content distributed in response to the request transmitted by the transmitting unit 52.

The EPG data generation unit 55 generates EPG data for displaying an EPG on the basis of program data transmitted for each channel of the television broadcasting. At this time, in the unused channel, the EPG data is generated for displaying the EPG including display information indicating that the content uploaded to the predetermined URL is distributed.

The display unit 56 displays the television broadcast program received by the television broadcast receiving unit 53 or the content received by the content receiving unit 54. In addition, the display unit 56 displays the EPG on the basis of the EPG data generated by the EPG data generation unit 55.

<Content Distribution Process of Server>

Figure 5:
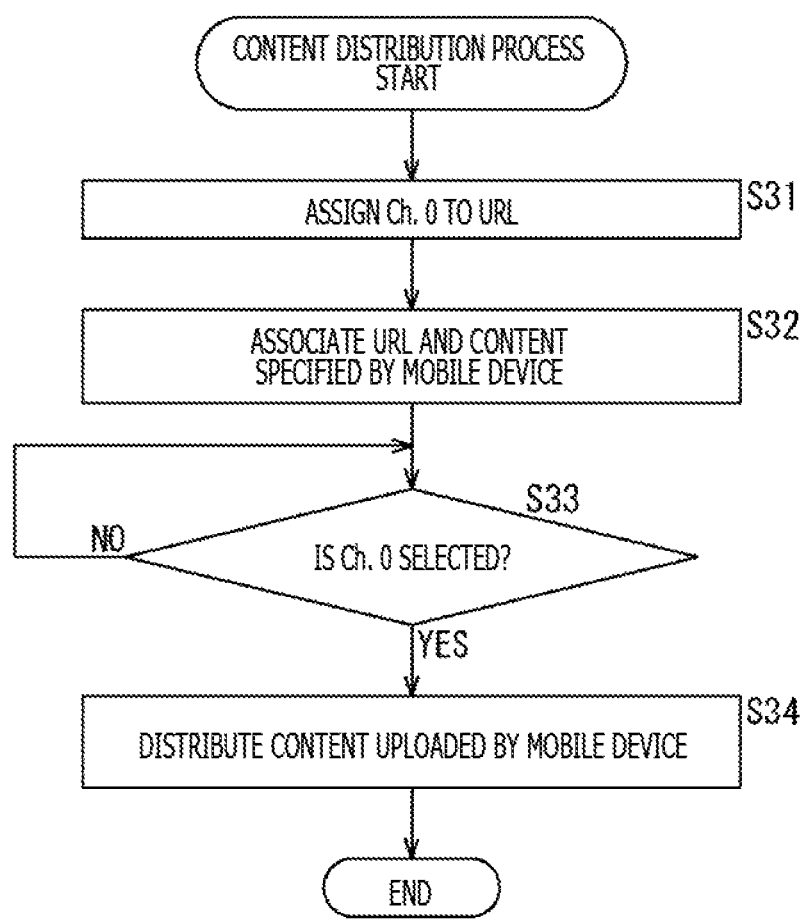
FIG. 5 is a flowchart describing a content distribution process.

FIG. 5 is a flowchart describing a content distribution process of the server 12. Processing of FIG. 5 is executed by linking the mobile device 11 and the television receiver 13 together by using the predetermined method.

In step S31, on the basis of the communication with the television receiver 13, the assignment unit 32 assigns the Ch. 0 to the predetermined URL in the server 12 as the unused channel that is not used for the television broadcasting in the television receiver 13.

In step S32, on the basis of the communication with the mobile device 11, the association unit 33 associates the predetermined URL with the content (for example, the image photographed by the mobile device 11) specified by the mobile device 11.

In step S33, the communication unit 31 determines whether or not the Ch. 0 is selected in the television receiver 13 on the basis of whether or not the request for the content uploaded to the predetermined URL is received from the television receiver 13.

Until the Ch. 0 is selected in the television receiver 13, that is, until the communication unit 31 receives the request for the content from the television receiver 13, the process of step S33 is repeated. Then, when the Ch. 0 is selected in the television receiver 13 and the communication unit 31 receives the request for the content, the process proceeds to step S34.

In step S34, in accordance with the request from the television receiver 13, the distribution control unit 34 controls the content uploaded to the predetermined URL by the mobile device 11 to be distributed to the television receiver 13. At this time, the content may be downloaded to the television receiver 13 or the distribution control unit 34 may prepare a Web page by using the content so that the Web page can be browsed through a browser in the television receiver 13.

<Content Reception Process of Television Receiver>

Figure 6:
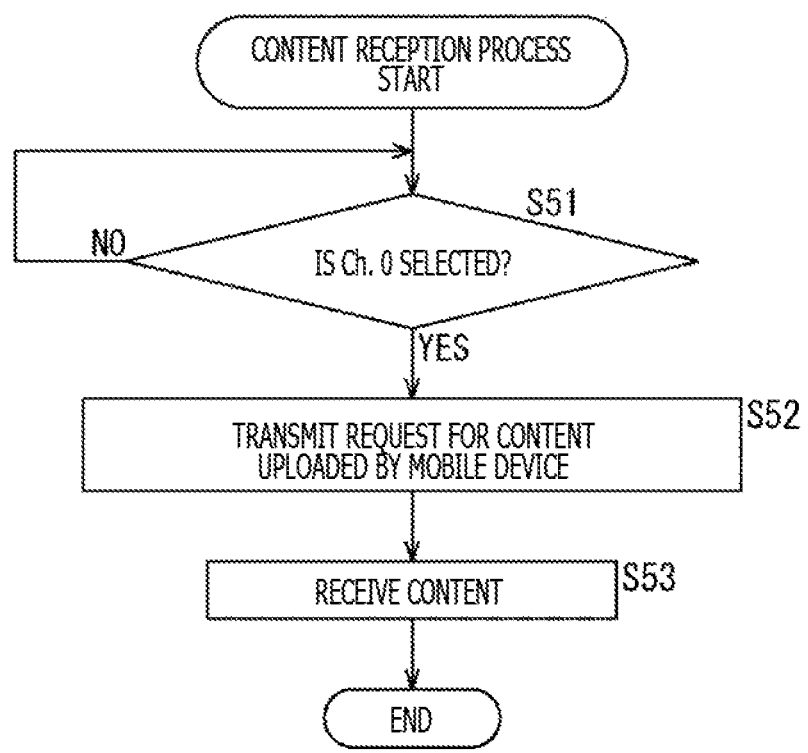
FIG. 6 is a flowchart describing a content reception process.

FIG. 6 is a flowchart describing a content reception process of the television receiver 13.

In step S51, the selection receiving unit 51 determines whether or not the button for selecting the Ch. 0 is operated in the remote commander 14.

Until the button for selecting the Ch. 0 is operated in the remote commander 14, the process of step S51 is repeated. Then, when the button for selecting the Ch. 0 is operated in the remote commander 14, the process proceeds to step S52.

In step S52, the transmitting unit 52 transmits to the server 12 the request for the content (image photographed by the mobile device 11) uploaded to the predetermined URL by the mobile device 11.

Then, in step S53, the content receiving unit 54 receives the content distributed in accordance with the request transmitted by the transmitting unit 52. At this time, the content may be downloaded to the television receiver 13 or the server 12 may prepare a Web page by using the content so that the Web page can be browsed through the browser in the television receiver 13.

According to the above processes, in the same manner as viewing the television broadcast program, the user can view a desired content that has been uploaded in advance, by a simple operation using the remote commander 14 of the television receiver 13.

Figure 7:
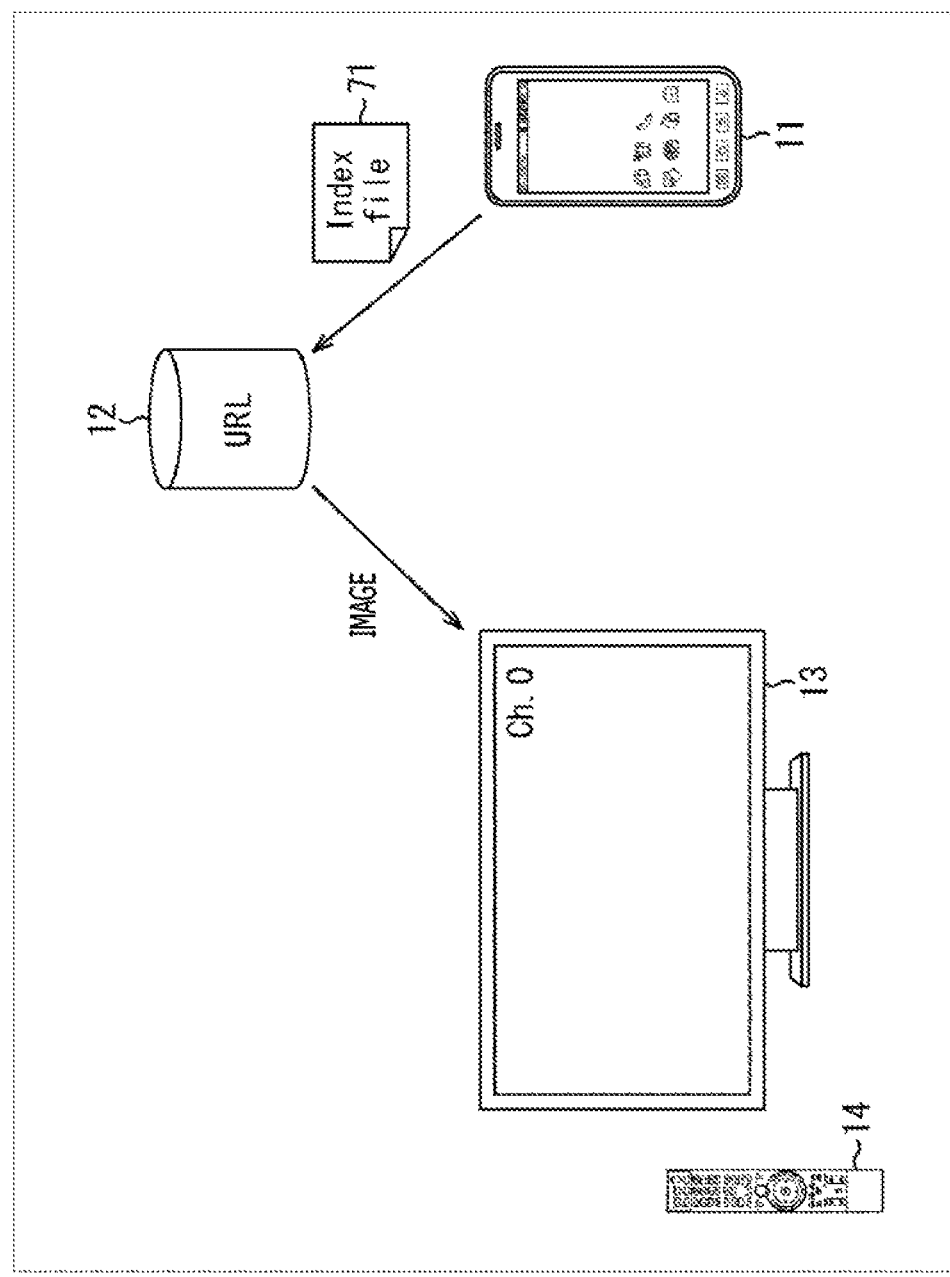
FIG. 7 is a diagram describing a flow of the distribution of the content.

In the above description, the image photographed by the mobile device 11 is assumed to be directly uploaded to the predetermined URL in the server 12; instead, as illustrated in FIG. 7, an index file 71 may be uploaded. In this case, the image photographed by the mobile device 11 may be stored in another area of the server 12 or may be stored in another device in the network.

The index file 71 is generated by the mobile device 11. In the index file 71, a title of the image photographed by the mobile device 11, a URL indicating a position in which the image is stored, or the like is described.

In this case, when the Ch. 0 is selected in the television receiver 13, the image that is stored in the URL described in the index file is enabled to be browsed in the television receiver 13.

Further, the content uploaded to the predetermined URL in the server 12 is not limited to a still image; further, may be a moving image, a voice, or a text, or may be the bookmark of the predetermined Web page.

Figure 8:
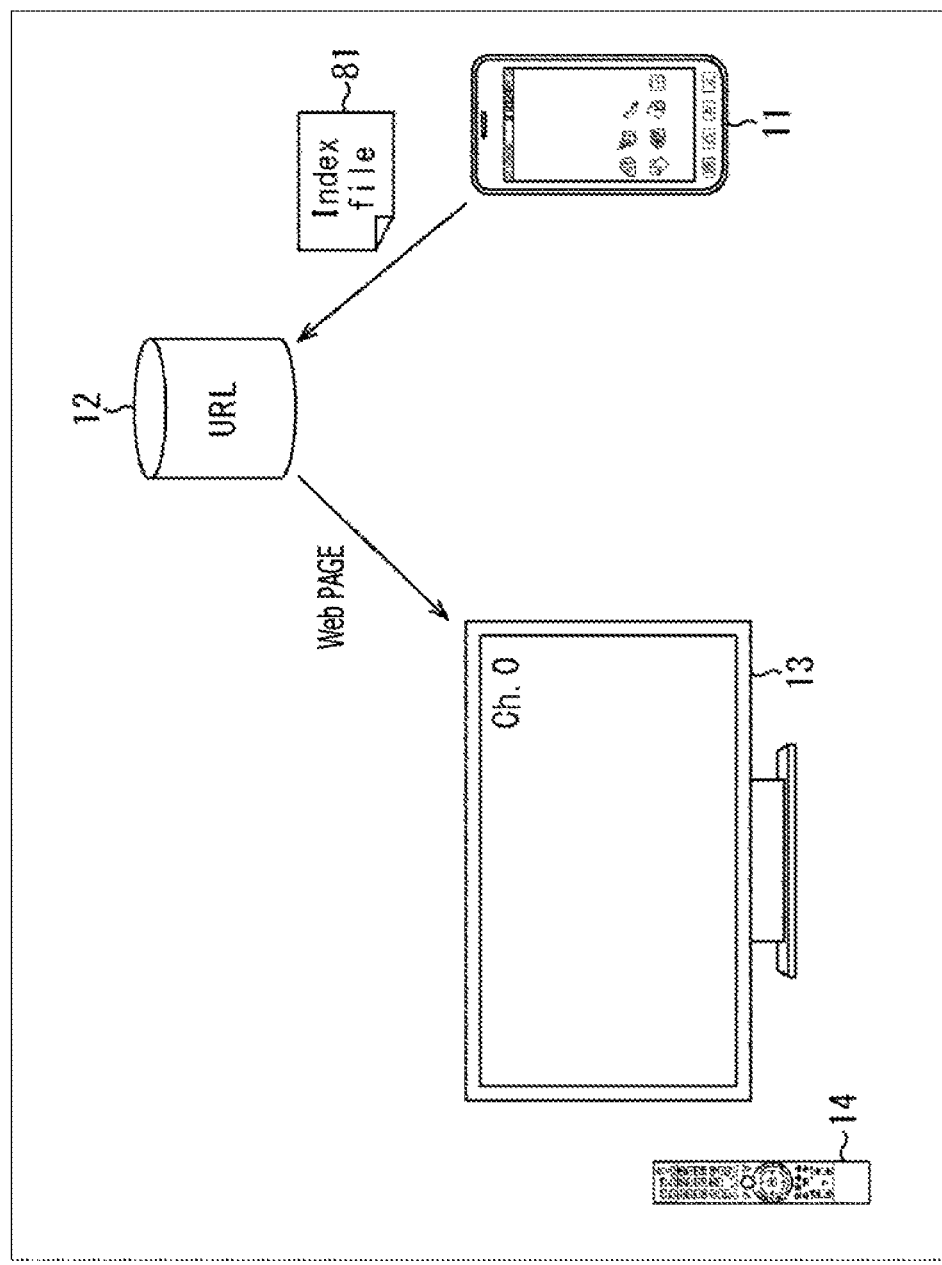
FIG. 8 is a diagram describing a flow of the distribution of the content.

In the case where the bookmark of the predetermined Web page is uploaded to the predetermined URL in the server 12, an index file 81 is set to be uploaded as illustrated in FIG. 8.

The index file 81 is also prepared by the mobile device 11. In the index file 81, the URL, etc. of the predetermined Web page are described.

In this case, when the Ch. 0 is selected in the television receiver 13, the predetermined Web page indicated by the URL described in the index file is enabled to be browsed in the television receiver 13.

Through this process, by selecting the Ch. 0 in the television receiver 13 after the user gets home, the user can easily browse the Web page retrieved at a place where the user has visited or the like.

<Link Between Mobile Device and Television Receiver>

The link between the mobile device 11 and the television receiver 13 is made by preparing a registration menu of the mobile device 11 in the television receiver 13.

Figure 9:
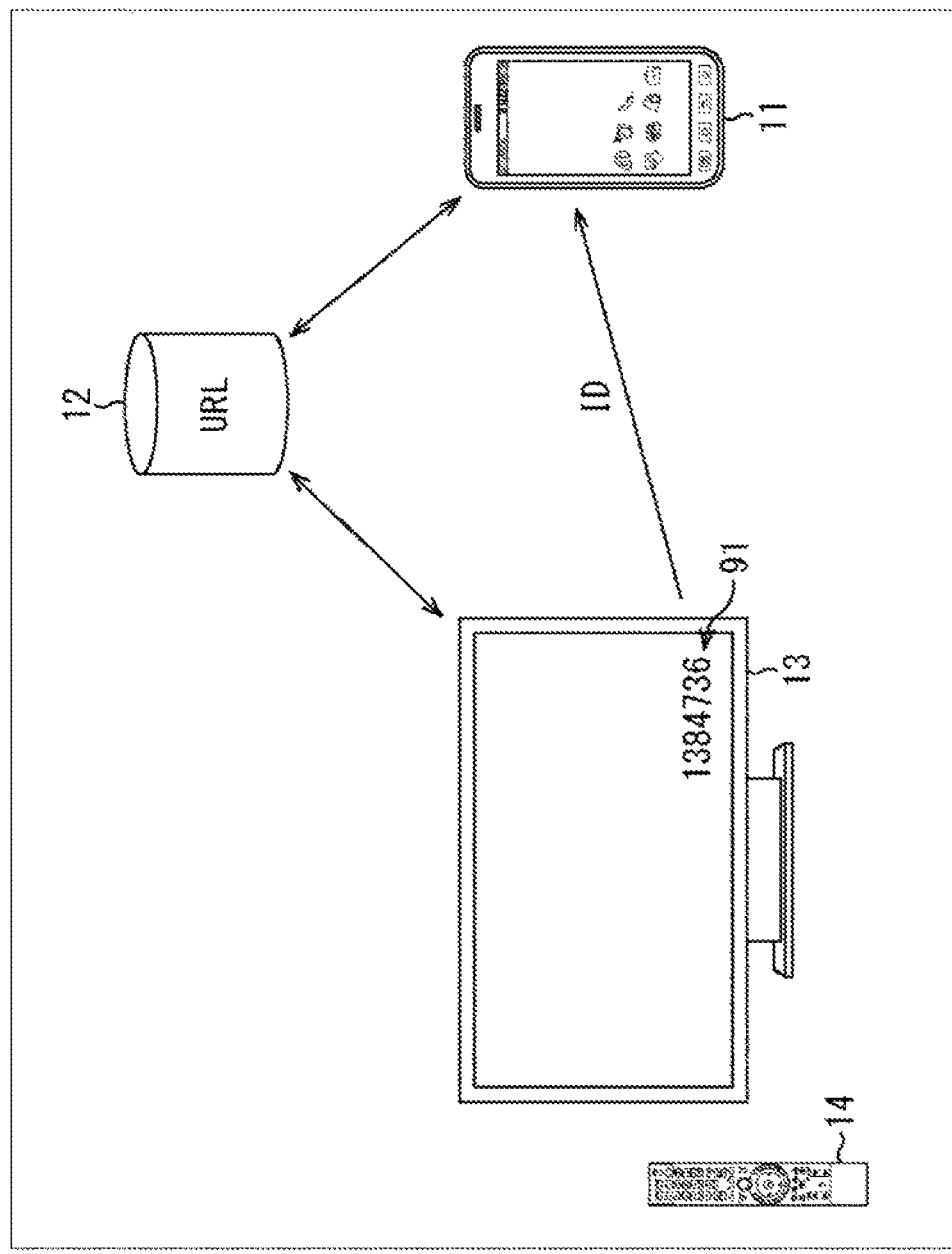
FIG. 9 is a diagram describing a link between a mobile device and the television receiver.

In the registration menu of the mobile device 11 in the television receiver 13, as illustrated in FIG. 9, for example, an ID 91 is issued by the television receiver 13 and displayed on a monitor (the display unit 56). In the example of FIG. 9, the ID 91 is a numeric value of eight digits "1384736." The ID 91 is directly input to the mobile device 11 by an operation of the user, and thereby the link between the mobile device 11 and the television receiver 13 is made. This process permits the server 12 to assign the unused channel in the television receiver to the predetermined URL, and associate the content specified by the mobile device 11 and the predetermined URL with each other.

In this case, by using the ID 91, for example, the following URL is defined.

URL: www.somy.com/brabia/xxxxx/ID=1384736

Note that the ID 91 may be described in the above-described index file.

Figure 10:
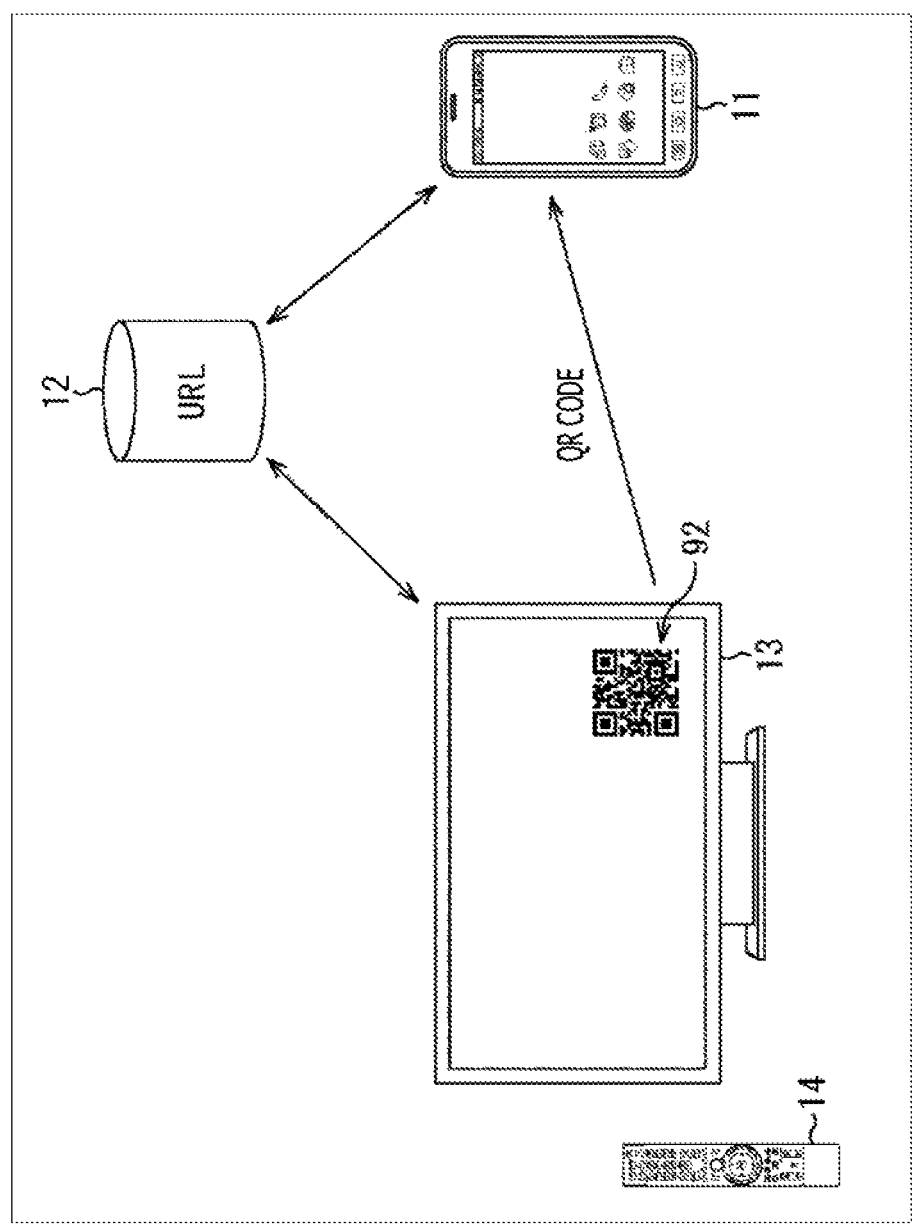
FIG. 10 is a diagram describing the link between the mobile device and the television receiver.

Further, in the registration menu of the mobile device 11 in the television receiver 13, an ID is issued by the television receiver 13 and, as illustrated in FIG. 10, a code such as a QR code (registered trademark) 92 in which information including the ID is encoded may be displayed on the monitor. In this case, the QR (registered trademark) code 92 is read in the mobile device 11, and thereby the link between the mobile device 11 and the television receiver 13 is made.

At this time, the predetermined URL itself may be included in the QR (registered trademark) code 92 and the above-described URL may be defined.

<Association in Each Class of Content>

In the present embodiment, different channels can be assigned to a plurality of URLs and, for each class of contents specified by the mobile device, the plurality of URLs and the respective contents can be also associated with each other.

(An Example in which the Class of Contents is an ID for Specifying Mobile Devices)

Figure 11:
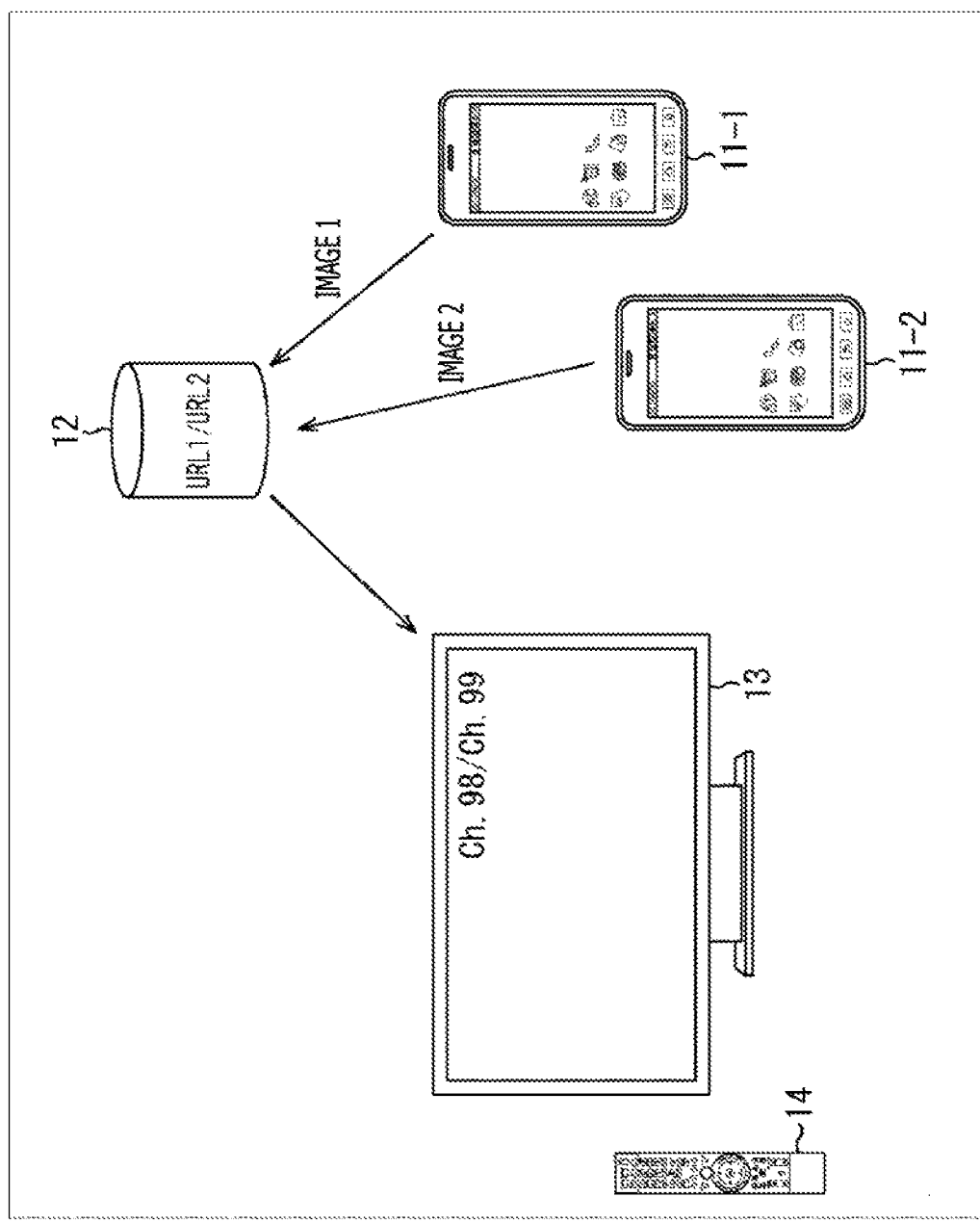
FIG. 11 is a diagram describing a flow of the distribution of the content.

As illustrated in FIG. 11, for example, an unused channel 98 (Ch. 98) that is not used for the television broadcasting in the television receiver 13 is assigned to a predetermined URL 1 in the server 12. In a similar manner, an unused channel 99 (Ch. 99) that is not used for the television broadcasting in the television receiver 13 is assigned to a predetermined URL 2 in the server 12.

In the example of FIG. 11, an image 1 photographed by a mobile device 11-1 possessed by one user is uploaded to the predetermined URL 1 in the server 12 and an image 2 photographed by a mobile device 11-2 possessed by another user is uploaded to the predetermined URL 2 in the server 12. Needless to say, as described with reference to FIG. 7, an index file in which information regarding the respective images is described may be uploaded to the respective URLs.

Then, in the case where the Ch. 98 is selected in the television receiver 13, the image uploaded to the predetermined URL 1 in the server 12 is distributed to the television receiver 13. In addition, in the case where the Ch. 99 is selected in the television receiver 13, the image uploaded to the predetermined URL 2 in the server 12 is distributed to the television receiver 13.

In this example, in a similar manner to the examples of FIGS. 9 and 10, the link between the mobile device 11-1 and the television receiver 13 and the link between the mobile device 11-2 and the television receiver 13 are made by the television receiver 13 issuing an ID to each of the mobile devices 11-1 and 11-2.

Suppose that the IDs are numeric values of eight digits "1384736" and "1384737," for example, the following URL 1 and URL 2 are defined, respectively.

URL 1: www.somy.com/brabia/xxxxx/ID=1384736
URL 2: www.somy.com/brabia/xxxxx/ID=1384737

That is, in the example of FIG. 11, the contents specified by the mobile devices 11-1 and 11-2 are associated with the URL 1 and the URL 2, respectively, for each ID for specifying the mobile device 11-1 or 11-2.

Further, as illustrated in FIG. 12, the unused channels (Ch. 98, Ch. 99) that are not used for the television broadcasting may be set to be displayed in a registration menu 111 displayed on the monitor of the television receiver 13. At this time, a QR code (registered trademark) 112 corresponding to the selected unused channel (Ch. 98) is set to be displayed.

In this case, the QR code (registered trademark) 112 is read in the mobile device 11-1 and thereby the link between the mobile device 11-1 and the television receiver 13 is made.

In the examples of FIGS. 11 and 12, the EPG indicating that the content uploaded to the URL 1 is distributed in the Ch. 98 and the content uploaded to the URL 2 is distributed in the Ch. 99 is displayed on the monitor of the television receiver 13.

FIG. 13 is a diagram illustrating an example of the EPG displayed in the television receiver 13.

In the EPG illustrated in FIG. 13, in relation to the Ch. 1 to the Ch. 5, titles of programs broadcasted in each time band in the respective channels are displayed as a list along with icons of broadcasting stations corresponding to the respective channels.

Further, in the EPG illustrated in FIG. 13, in relation to the Ch. 98, an icon of "brother's channel" indicating that it is a channel of the user of the mobile device 11-1 and respective titles 121 as display information indicating images of "photo of cat," "photo of dog," and "photo of rabbit" uploaded by the mobile device 11-1 are displayed.

In a similar manner, in relation to the Ch. 99, an icon of "sister's channel" indicating that it is a channel of the user of the mobile device 11-2 and respective titles 122 of images of "photo of sea," "photo of mountain," and "photo of dish" uploaded by the mobile device 11-2 are displayed.

That is, in the example of FIG. 13, when the Ch. 98 is selected in the television receiver 13, the images of "photo of cat," "photo of dog," and "photo of rabbit" uploaded by the mobile device 11-1 are enabled to be browsed and when the Ch. 99 is selected in the television receiver 13, the images of "photo of sea," "photo of mountain," and "photo of dish" uploaded by the mobile device 11-2 are enabled to be browsed.

Note that in the EPG illustrated in FIG. 13, the titles of the images enabled to be browsed in the unused channels are displayed side by side in a predetermined order in the direction indicating a time axis.

This order may be the time when those images are specified by the mobile device 11-1 or the mobile device 11-2 (the time when uploading is instructed) or may be a descending order of the intensity of preference of the user of the mobile device 11-1 or the mobile device 11-2.

(An Example in which the Class of Contents is a Kind of Mediums)

As illustrated in FIG. 14, for example, the unused channel 98 (Ch. 98) that is not used for the television broadcasting in the television receiver 13 is assigned to the predetermined URL 1 in the server 12. In a similar manner, the unused channel 99 (Ch. 99) that is not used for the television broadcasting in the television receiver 13 is assigned to the predetermined URL 2 in the server 12.

In the example of FIG. 14, a still image photographed by the mobile device 11 is uploaded to the predetermined URL 1 in the server 12 and a moving image photographed by the mobile device 11 is uploaded to the predetermined URL 2 in the server 12. Needless to say, as described with reference to FIG. 7, the index files in which information regarding the respective still image and moving image is described may be uploaded to the respective URLs.

Then, in the case where the Ch. 98 is selected in the television receiver 13, the still image uploaded to the predetermined URL 1 in the server 12 is distributed to the television receiver 13. Further, in the case where the Ch. 99 is selected in the television receiver 13, the moving image uploaded to the predetermined URL 2 in the server 12 is distributed to the television receiver 13.

In this example, in a similar manner to the examples of FIGS. 9 and 10, the link between the mobile device 11 and the television receiver 13 is made by the television receiver 13 issuing an ID to the mobile device 11.

Suppose that the ID of the mobile device 11 is a numeric value of eight digits "1384736," for example, the following URL 1 and URL 2 are defined.

URL 1: www.somy.com/brabia/xxxxx/ID=1384736/media=photo
URL 2: www.somy.com/brabia/xxxxx/ID=1384736/media=movie That is, in the example of FIG. 14, the contents specified by the mobile device 11 are individually associated with the URL 1 and URL 2 for each kind of the mediums of the contents specified by the mobile device 11. Note that as a kind of the mediums, a voice, a text, and the like are included in addition to the still image and the moving image.

Figure 15:
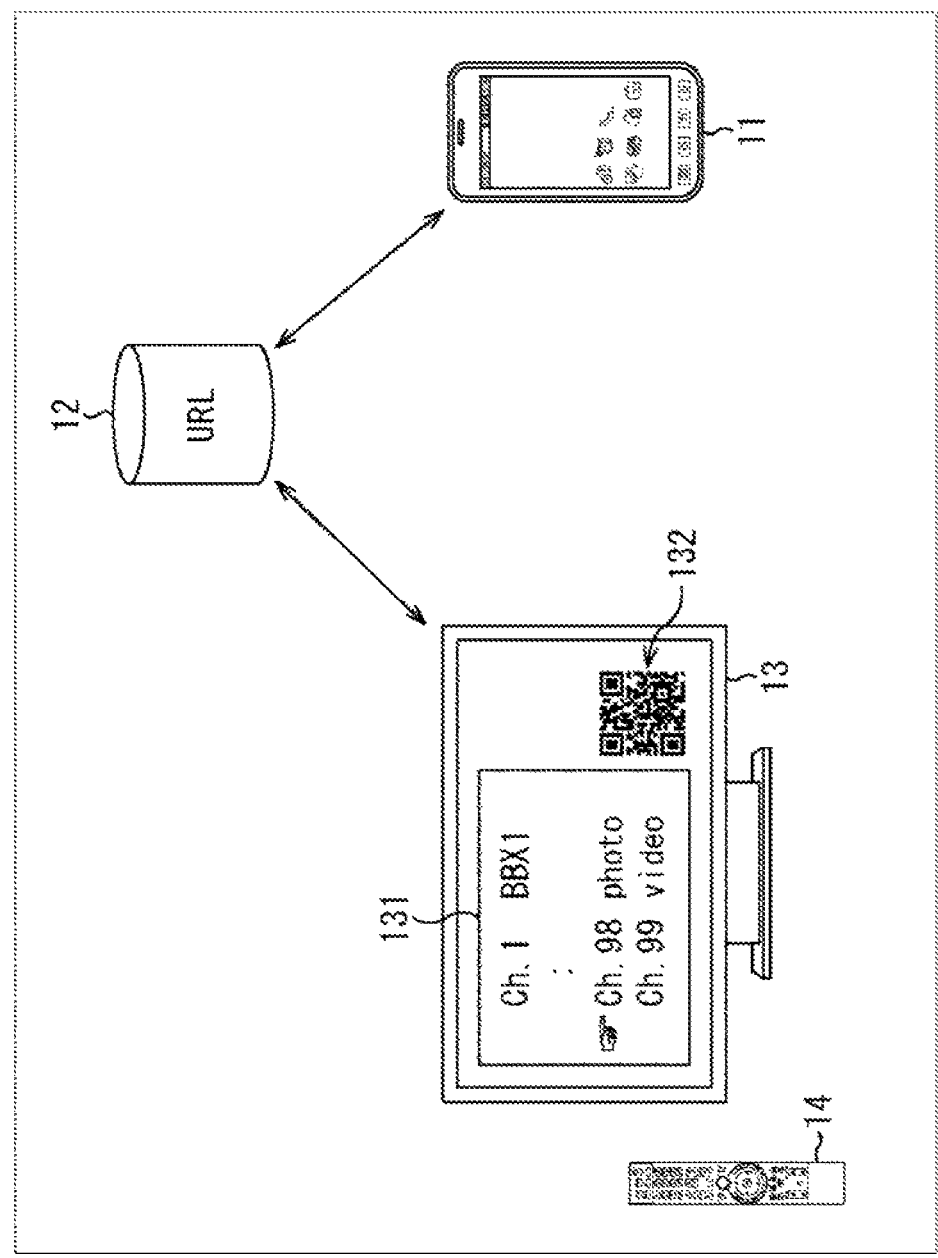
FIG. 15 is a diagram describing the link between the mobile device and the television receiver.

Further, as illustrated in FIG. 15, the unused channels (Ch. 98, Ch. 99) that are not used for the television broadcasting may be set to be displayed in a registration menu 131 displayed on the monitor of the television receiver 13. At this time, a QR code (registered trademark) 132 corresponding to the selected unused channel (Ch. 98) is set to be displayed.

In this case, the QR code (registered trademark) 132 is read in the mobile device 11, and thereby the link between the mobile device 11 and the television receiver 13 is made.

Figure 16:
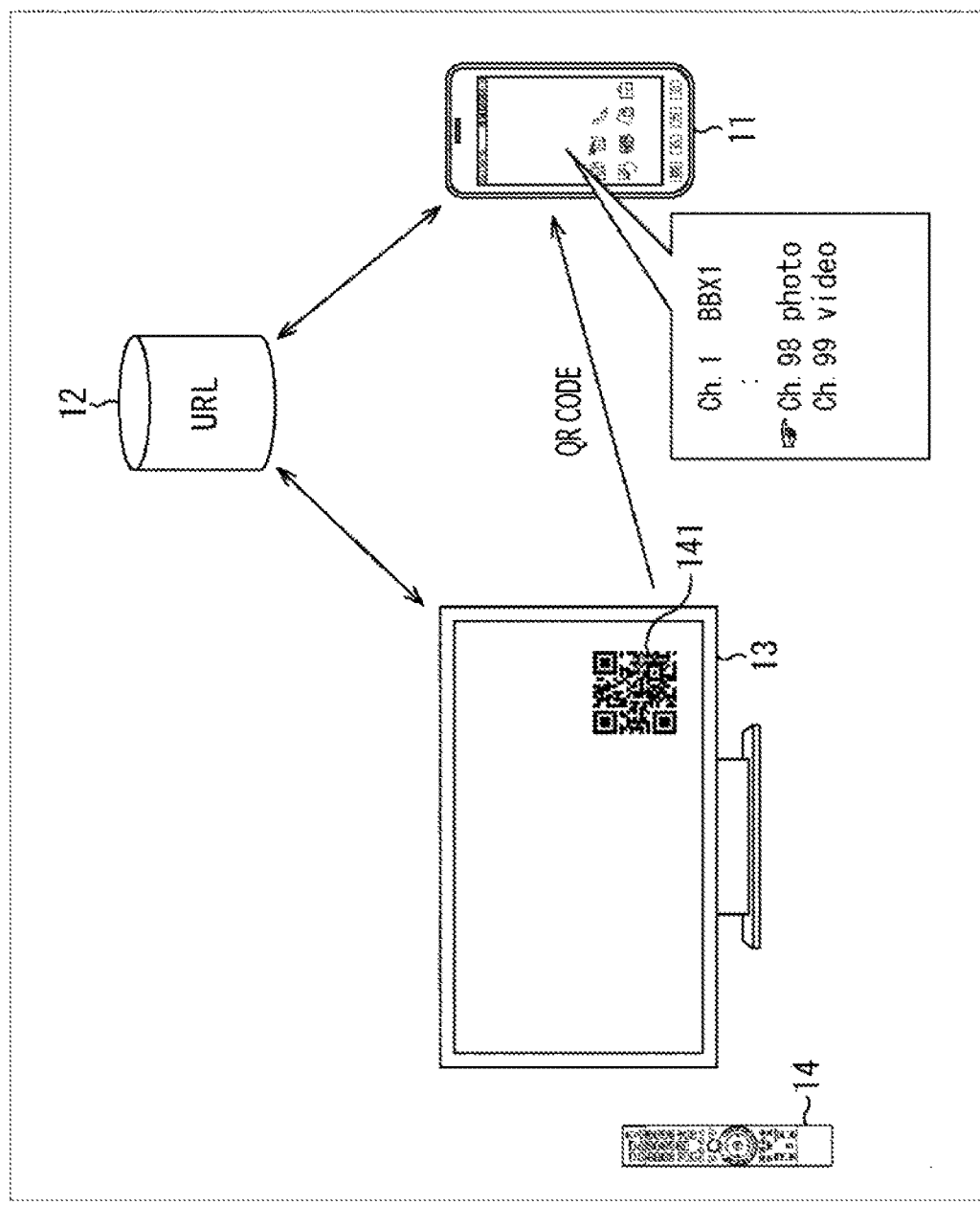
FIG. 16 is a diagram describing the link between the mobile device and the television receiver.

Further, as illustrated in FIG. 16, unused channel information indicating the unused channel may be included in a QR code (registered trademark) 141 displayed on the monitor of the television receiver 13. In this case, on the basis of the operation by the user to the mobile device 11, the content specified by the mobile device 11 may be set to be associated with the URL to which the unused channel is assigned.

In the examples of FIGS. 14, 15, and 16, the EPG indicating that the content uploaded to the URL 1 is distributed in the Ch. 98 and the content uploaded to the URL 2 is distributed in the Ch. 99 is displayed on the monitor of the television receiver 13.

FIG. 17 is a diagram illustrating an example of the EPG displayed in the television receiver 13.

In the EPG illustrated in FIG. 17, in relation to the Ch. 1 to the Ch. 5, titles of programs broadcasted in each time band in the respective channels are displayed as a list along with icons of the broadcasting stations corresponding to the respective channels.

In the EPG illustrated in FIG. 17, in relation to the Ch. 98, an icon of "my photo" indicating that it is a channel of still images and respective titles 151 of still images of "photo of cat," "photo of dog," and "photo of rabbit" uploaded by the mobile device 11 are displayed.

In a similar manner, in relation to the Ch. 99, an icon of "my movie" indicating that it is a channel of moving images and respective titles 152 of moving images of "video of sea," "video of mountain," and "video of dish" uploaded by the mobile device 11 are displayed.

That is, in the example of FIG. 17, when the Ch. 98 is selected in the television receiver 13, the still images of "photo of cat," "photo of dog," and "photo of rabbit" uploaded by the mobile device 11 are enabled to be browsed and when the Ch. 99 is selected in the television receiver 13, the moving images of "video of sea," "video of mountain," and "video of dish" uploaded by the mobile device 11 are enabled to be browsed.

Note that even in the EPG illustrated in FIG. 17, the titles of the images enabled to be browsed in the unused channels are displayed side by side in the predetermined order in the direction indicating the time axis.

This order may be the time when those images are specified by the mobile device 11 (the time when uploading is instructed) or may be a descending order of the intensity of preference of the user of the mobile device 11. Further, the order of the moving images enabled to be browsed in the Ch. 99 may be an order based on the reproduction time of those moving images.

OTHER EXAMPLES

In the above description, an example in which the class of contents is the ID for specifying mobile devices and an example in which the class of contents is the kind of mediums are described. In addition to the above, the class of contents may be a category of contents (for example, a landscape painting, a figure painting, or the like in the case where the content is a still image) or may be the intensity (strong, middle, weak, or the like) of the preference of the user of the mobile device 11 that has specified the content (that has instructed the uploading).

<Generation and Usage of Index File>

As described above, from the mobile device 11 to the predetermined URL in the server 12, the content is enabled to be directly uploaded and, in addition thereto, the index file is enabled to be uploaded.

Figure 18:
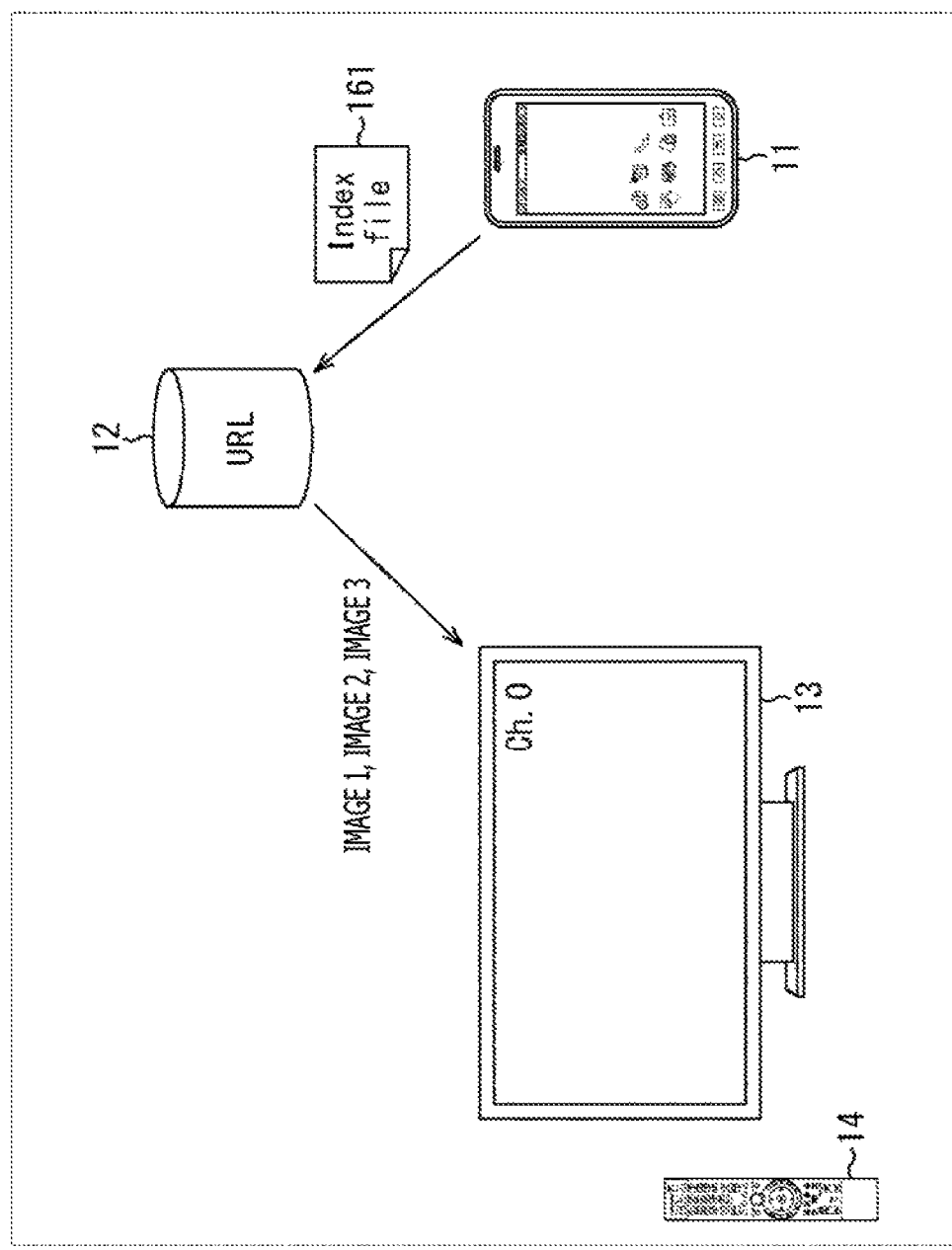
FIG. 18 is a diagram describing a flow of the distribution of the content.

FIG. 18 is a diagram describing a flow of the distribution of the content of a case in which the index file is uploaded.

In the example of FIG. 18, an index file 161 generated by the mobile device 11 is uploaded to the predetermined URL in the server 12.

In the index file 161, titles of a plurality of images (image 1, image 2, image 3) photographed by the mobile device 11 and the URLs indicating positions in which those images are stored are described and, in addition thereto, priorities or the like regarding those images are described.

In this case, when the Ch. 0 is selected in the television receiver 13, the respective images that are stored in the URLs described in the index file 161 are enabled to be browsed in the television receiver 13 in accordance with the priorities.

Figure 19:
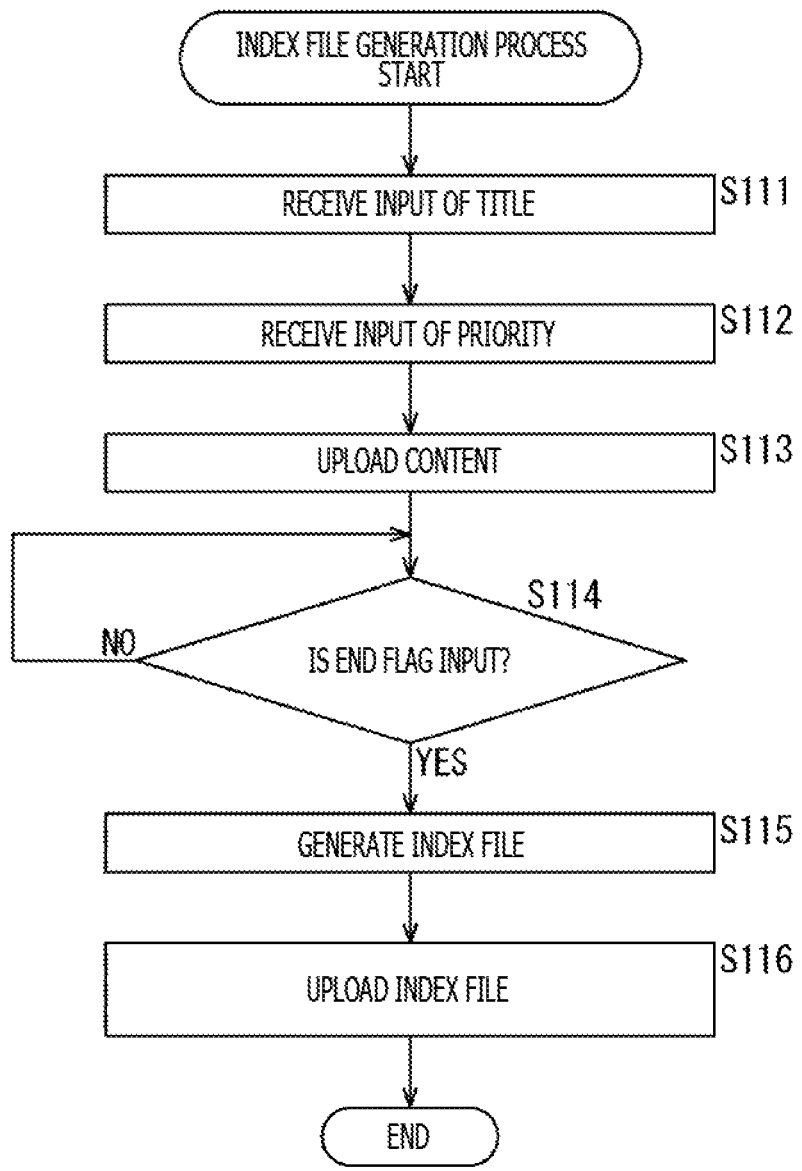
FIG. 19 is a flowchart describing an index file generation process.

Here, an index file generation process by the mobile device 11 will be described with reference to a flowchart of FIG. 19. Processing of FIG. 19 is enabled to be executed in a state in which the ID has been issued by the television receiver 13 and thus the registration of the mobile device 11 (link between the mobile device 11 and the television receiver 13) is completed and the URL of the storage location of the content has been acquired.

In step S111, the mobile device 11 receives an input of the titles of the contents by the operation of the user. Here, it is assumed that the contents are, for example, three pieces of still images photographed by the mobile device 11.

In step S112, the mobile device 11 receives an input of the priority of the content by the operation of the user.

In step S113, the mobile device 11 uploads the content to the URL acquired in advance.

In step S114, the mobile device 11 determines whether or not an end flag is input by the operation of the user.

Until the end flag is input, the process of step S114 is repeated. Then, when the end flag is input, the process proceeds to step S115.

In step S115, the mobile device 11 generates the index file.

Then, in step S116, to the predetermined URL in the server 12, the mobile device 11 uploads the index file in which the input titles, the priorities, and the URLs to which contents are uploaded are described.

Figure 20:
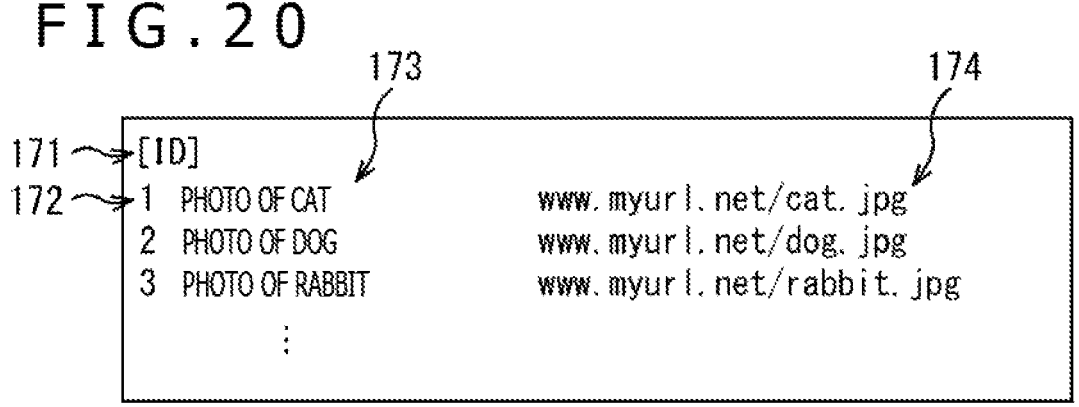
FIG. 20 is a diagram illustrating an example of an index file.

FIG. 20 illustrates an example of the index file generated by the mobile device 11.

In the index file of FIG. 20, in a leading area 171, the ID issued to the mobile device 11 is described.

In each row below the area 171, information regarding the content uploaded by the mobile device 11 is described.

Concretely, in a leading area 172 of each row, the priority of the content is described. In a second-column area 173 of each row, the title of the content is described. Further, in a third-column area 174 of each row, the URL as the storage location of the content is described.

According to the index file of FIG. 20, the "photo of cat" which is a content of the first priority is stored as cat.jpg in a position indicated by www/myurl.net/. In a similar manner, the "photo of dog" which is a content of the second priority is stored as dog.jpg in a position indicated by www/myurl.net/, and the "photo of rabbit" which is a content of the third priority is stored as rabbit.jpg in a position indicated by www/myurl.net/.

Next, with reference to a flowchart of FIG. 21, the content distribution process in the case where the above-described index file is uploaded will be described.

Figure 21:
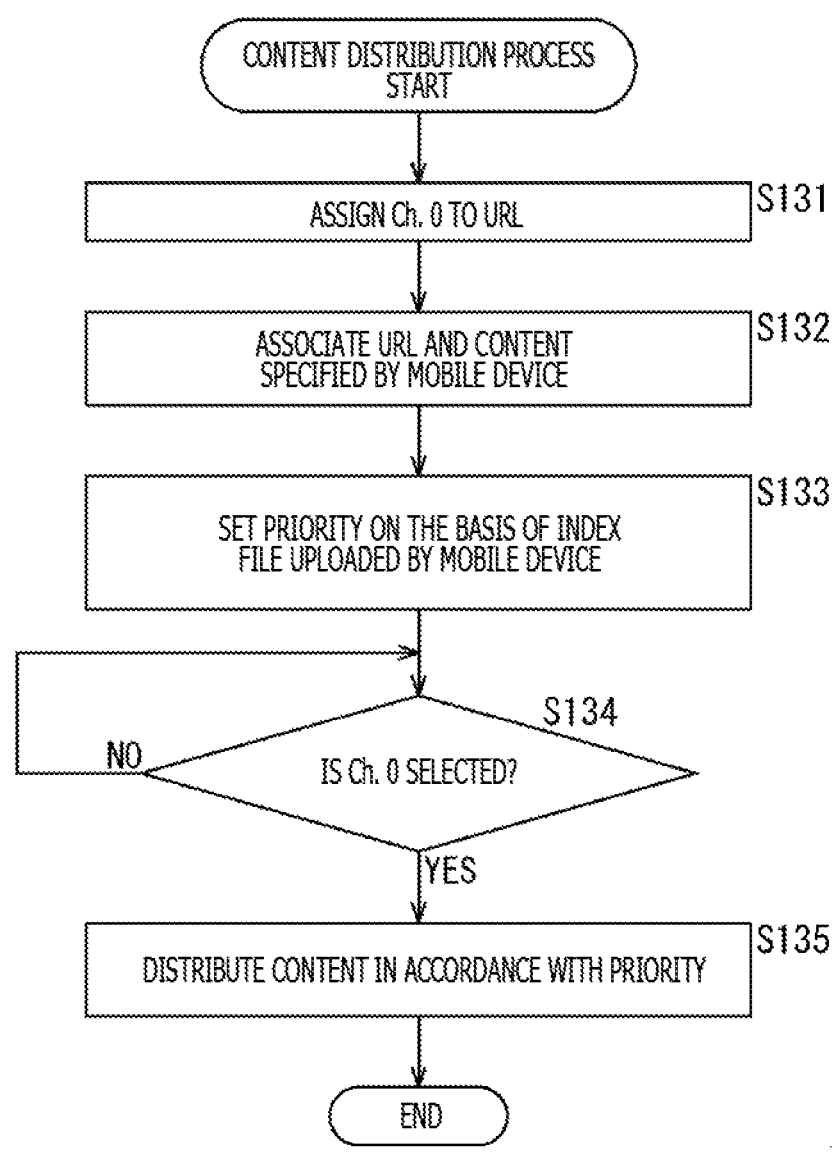
FIG. 21 is a flowchart describing the content distribution process.

Note that the processes of steps S131 and S132 of the flowchart of FIG. 21 are similar to those of steps S31 and S32 of the flowchart of FIG. 5, and therefore the description is omitted.

In step S133, the setting unit 35 sets the priorities of the distribution of the contents on the basis of the index file uploaded to the predetermined URL by the mobile device 11.

In step S134, the communication unit 31 determines whether or not the Ch. 0 is selected in the television receiver 13 on the basis of whether or not the request for the content uploaded to the predetermined URL is received from the television receiver 13.

Until the Ch. 0 is selected in the television receiver 13, that is, until the communication unit 31 receives the requests for the contents from the television receiver 13, the process of step S134 is repeated. Then, when the Ch. 0 is selected in the television receiver 13 and the communication unit 31 receives the requests for the contents, the process proceeds to step S135.

In step S135, in response to the requests from the television receiver 13, the distribution control unit 34 controls the uploaded contents to be sequentially distributed to the television receiver 13 in accordance with the set priorities.

In the example of FIG. 21, on the monitor of the television receiver 13, there is displayed the EPG indicating that the contents uploaded to the predetermined URLs in the Ch. 0 are sequentially distributed in accordance with the set priorities.

FIG. 22 is a diagram illustrating an example of the EPG displayed in the television receiver 13.

In the EPG illustrated in FIG. 22, in relation to the Ch. 1 to the Ch. 5, titles of programs broadcasted in each time band in respective channels are displayed as a list along with icons of broadcasting stations corresponding to the respective channels.

In the EPG illustrated in FIG. 22, in relation to the Ch. 0, an icon of "my channel" indicating that it is a channel of the user of the mobile device 11 and respective titles 181 of the images of "photo of cat," "photo of dog," and "photo of rabbit" uploaded by the mobile device 11 are displayed. The titles of those images are displayed in accordance with the priorities in the direction indicating the time axis.

That is, in the example of FIG. 22, when the Ch. 0 is selected in the television receiver 13, the images of "photo of cat," "photo of dog," and "photo of rabbit" uploaded by the mobile device 11 are enabled to be browsed in accordance with the priorities. Needless to say, also in the above-described examples, the uploaded content is not limited to a still image, and may be a moving image, a voice, a text, or the like. That is, in the case in which a plurality of moving images are uploaded as the content, when the Ch. 0 is selected in the television receiver 13, those moving images are sequentially reproduced in accordance with the priorities.

Note that in the above-described examples, a plurality of contents are assumed to be sequentially distributed in accordance with the priorities set by being input to the mobile device 11 by the operation of the user; however, the plurality of contents may be sequentially distributed in the order of the time when the respective contents are specified by the mobile device 11, concretely, in the order of the time when the uploading is instructed.

<Another Configuration Example of Content Distribution System>

In the above-described content distribution system, the server 12 and the television receiver 13 are assumed to be separately configured; however, they may be configured as a unit.

Figure 23:
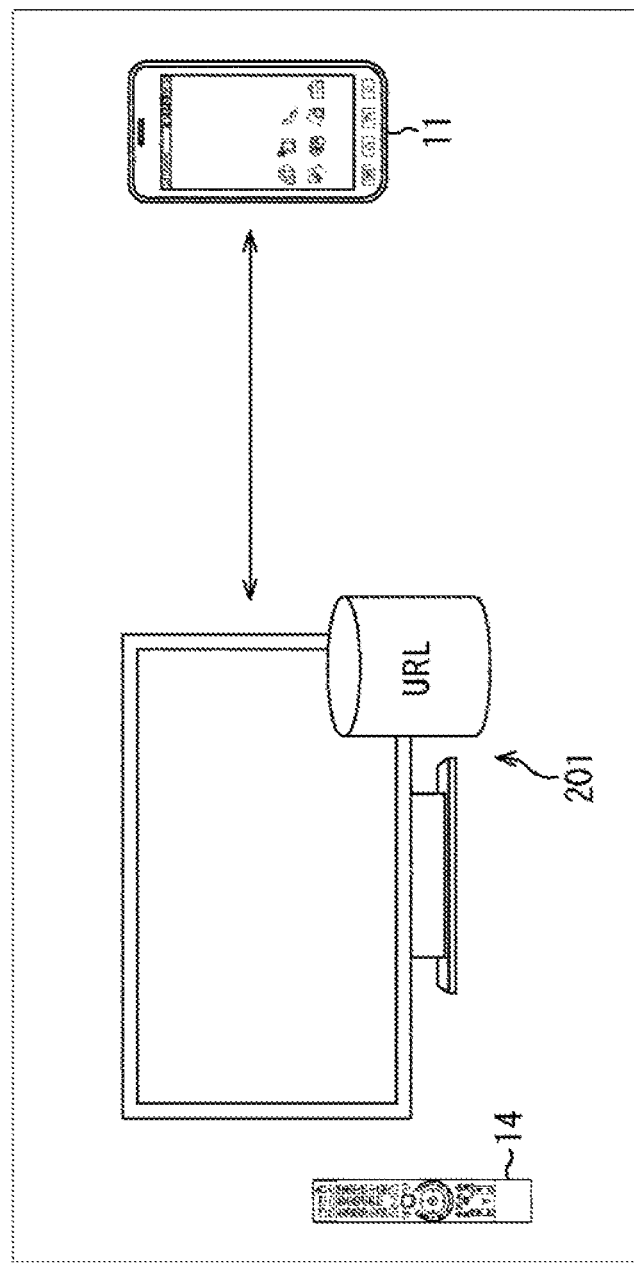
FIG. 23 is a diagram illustrating another configuration example of the content distribution system.

FIG. 23 illustrates another configuration example of the content distribution system to which the present technology is applied.

In FIG. 23, a television receiver 201 includes the functions of the server 12 in addition to the functions of the above-described television receiver 13. The similar processes to those of the above-described content distribution system can be executed by using this configuration.

Further, the above-described television receiver 13 may include a receiving apparatus such as a set-top box, and the monitor (display unit 56).

<Assignment of Channel>

In the above description, the URL assigned to the unused channel on the basis of the registration of the mobile device 11 is assumed to be defined in response to the ID issued to the mobile device 11 by which the content is uploaded or the kind of medium of the content.

Here, in the case where the content uploaded to the predetermined URL is a Web page, the URL of the Web page may be directly input to a channel list displayed in the television receiver 13.

Figure 24:
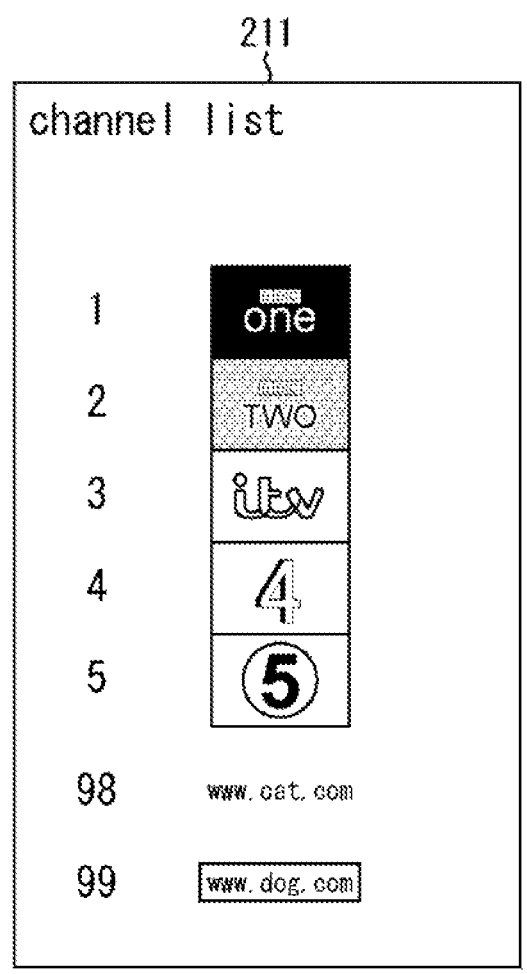
FIG. 24 is a diagram illustrating an example of a channel list displayed in the television receiver.

FIG. 24 illustrates an example of the channel list displayed in the television receiver 13.

In the channel list 211 of FIG. 24, in relation to the Ch. 1 to Ch. 5, the icons of the broadcasting stations corresponding to the respective channels are displayed.

Further, in the channel list 211, the URL "www.cat.com" input by the user is displayed in the Ch. 98 that is the unused channel. Further, there is expressed a manner in which "www.dog.com" is being input as the URL by the user in the Ch. 99 that is the unused channel.

That is, in the example of FIG. 24, when the Ch. 98 is selected in the television receiver 13, the Web page specified by "www.cat.com" is enabled to be browsed and, when the Ch. 99 is selected in the television receiver 13, the Web page specified by "www.dog.com" is enabled to be browsed.

<Modifications>

In the above description, the content such as a photo or a video is assumed to be associated with the unused channel via the specific information such as the URL or the ID; however, an aggregate service in which the contents are collected and provided may be associated with the unused channel, such as a content sharing service in which those contents can be shared in the Web or a video contribution site. At this time, a plurality of candidate services to be associated with the unused channel are prepared and the user is allowed to select any of the candidate services to thereby associate the aggregate service with the unused channel.

This process permits the user to view the content sharing service or the video contribution site only by selecting the corresponding unused channel in the television receiver 13.

APPLICATION EXAMPLES

In the above description, an example in which the present technology is applied to the content distribution system that enables the image or Web page specified by the mobile device to be browsed by the television receiver has been described, and further the present technology is applicable to other fields.

For example, the present technology may be applied to a monitoring system. In this case, still images or moving images imaged by a monitoring camera can be easily confirmed through the television receiver.

In addition, the present technology may be applied to an agricultural field management system. In this case, still images of a state of an agricultural field, growing conditions of crops, or the like, the still image being imaged by using a portable terminal possessed by a person who performs an agricultural work, can be easily confirmed through the television receiver.

Further, the present technology may be applied to a driving image recording system of an automobile. In this case, images imaged by an on-vehicle camera can be easily confirmed through the television receiver.

The series of processes described above can be executed by hardware and can also be executed by software. In the case where the series of processes are executed by software, a program that constitutes the software is installed into a computer. Here, the expression "computer" includes a computer incorporated in dedicated hardware and, for example, a general-purpose personal computer that is capable of executing various functions by installing various programs.

Figure 25:
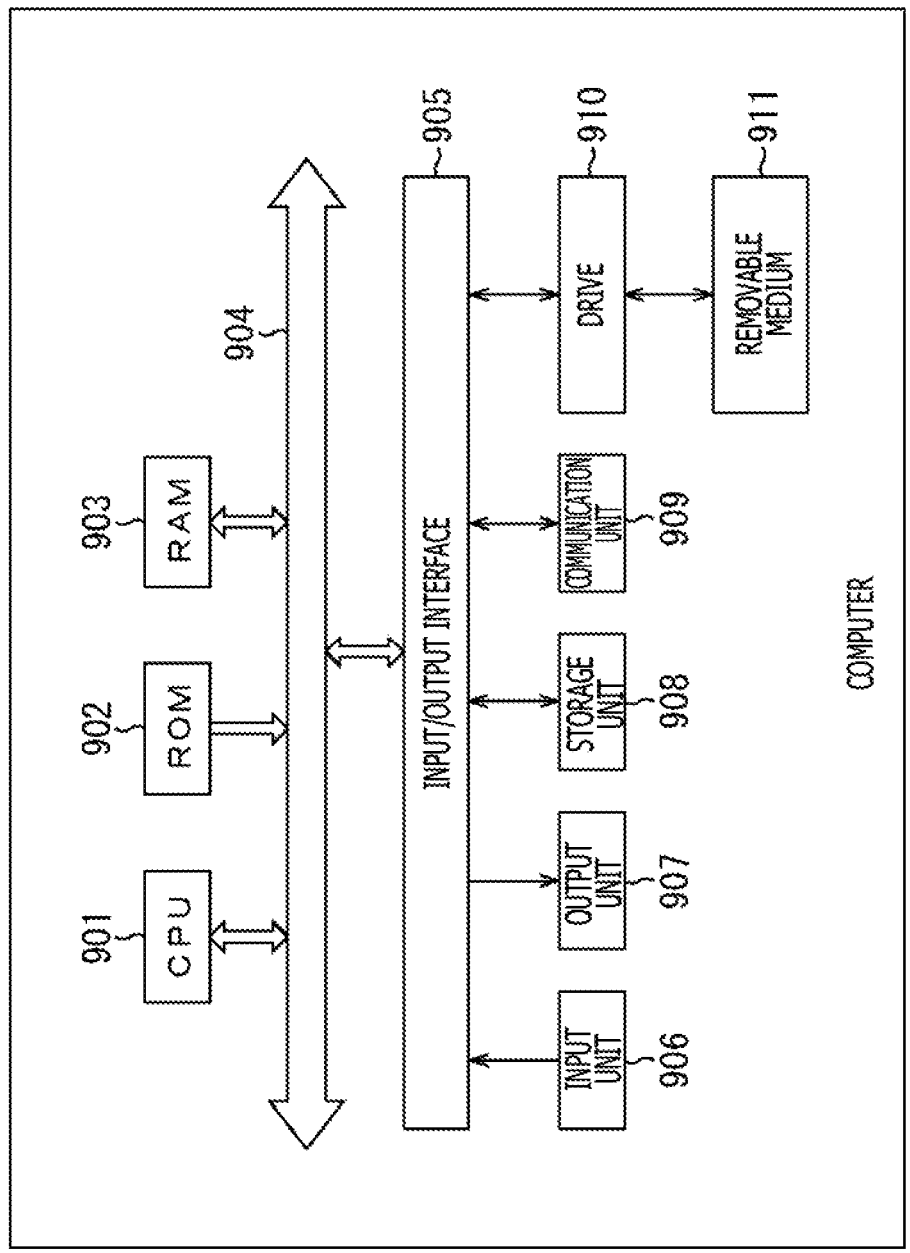
FIG. 25 is a block diagram illustrating a functional configuration example of a computer.

FIG. 25 is a block diagram illustrating a configuration example of the hardware of a computer that executes the series of processes described above by using a program.

In the computer, a CPU 901, a ROM (Read Only Memory) 902, and a RAM (Random Access Memory) 903 are mutually connected through a bus 904.

An input/output interface 905 is also connected to the bus 904. An input unit 906, an output unit 907, a storage unit 908, a communication unit 909, and a drive 910 are connected to the input/output interface 905.

The input unit 906 includes a keyboard, a mouse, a microphone, or the like. The output unit 907 includes a display, a speaker, or the like. The storage unit 908 includes a hard disk, a non-volatile memory, or the like. The communication unit 909 includes a network interface or the like. The drive 910 drives a removable medium 911 such as a magnetic disk, an optical disk, a magneto-optical disk, or a semiconductor memory.

In the computer configured as described above, for example, the CPU 901 loads a program stored in the storage unit 908 into the RAM 903 via the input/output interface 905 and the bus 904 and executes the program to thereby execute the series of processes described above.

For example, the program executed by the computer (the CPU 901) may be provided by being recorded on the removable medium 911 such as a packaged medium. The program can also be provided via a wired or wireless transfer medium, such as a local area network, the Internet, or a digital satellite broadcast.

In the computer, by loading the removable medium 911 into the drive 910, the program can be installed into the storage unit 908 via the input/output interface 905. It is also possible to receive the program via a wired or wireless transfer medium by the communication unit 909 and install the program into the storage unit 908. As another alternative, the program can be installed in advance into the ROM 902 or the storage unit 908.

Note that the program executed by the computer may be a program in which processes are executed in a time series in the order described in this specification or may be a program in which processes are executed in parallel or at necessary timing, such as a time when the processes are called.

Further, an embodiment of the present technology is not limited to the embodiment described above, and various changes and modifications may be made without departing from the scope of the present technology.

For example, the present technology can adopt a configuration of cloud computing which processes one function in cooperation by sharing roles by using a plurality of apparatuses through a network.

Further, each step described in the above-described flowcharts can be executed by one apparatus or can be executed while being shared by a plurality of apparatuses.

In addition, in the case where a plurality of processes are included in one step, the plurality of processes included in this one step can be executed by one apparatus or can be executed while being shared by a plurality of apparatuses.

In addition, the present technology may also be configured as below.

(1)

An information processing apparatus including:

an assignment unit configured to assign a predetermined channel of a television receiver to predetermined specific information;

an association unit configured to associate at least one content specified by a predetermined electronic device or a predetermined user with the specific information;

a receiving unit configured to receive a request for the content associated with the specific information from the television receiver in response to a selection of the channel in the television receiver; and a distribution control unit configured to control the content to be distributed to the television receiver in response to the request.

(2)

The information processing apparatus according to (1) above, in which the assignment unit assigns the different channels to respective pieces of the specific information, and the association unit associates the respective pieces of the specific information with the contents for each class of the contents.

(3)

The information processing apparatus according to (2) above, in which the class of the content is an ID for identifying the electronic device that specifies the content.

(4)

The information processing apparatus according to (2) above, in which the class of the content is a kind of medium.

(5)

The information processing apparatus according to (2) above, in which the class of the content is a category of the content or an intensity of a preference of the user of the electronic device that specifies the content.

(6)

The information processing apparatus according to (2) above, in which the association unit associates the content specified by the electronic device with the specific information in response to acquisition of information displayed on a display unit of the television receiver by the electronic device.

(7)

The information processing apparatus according to (6) above, in which the information displayed on the display unit includes channel information indicating the channel assigned to the specific information, and in response to the acquisition of the channel information by the electronic device, the association unit associates the specific information assigned to the channel indicated by the channel information with the content for each class of the content.

(8)

The information processing apparatus according to any one of (1) to (7) above, in which in a case where a plurality of the contents and the specific information are associated with each other, the distribution control unit controls the plurality of contents to be sequentially distributed to the television receiver in a predetermined order in response to the request.

(9)

The information processing apparatus according to (8) above, in which the distribution control unit controls the plurality of contents to be sequentially distributed to the television receiver in an order of time at which the contents are specified by the electronic device.

(10)

The information processing apparatus according to (8) above, further including:

a setting unit configured to set priorities of the distribution of the plurality of contents specified by the electronic device, in which in accordance with the set priorities, the distribution control unit controls the plurality of contents to be sequentially distributed to the television receiver.

(11)

The information processing apparatus according to (10) above, in which the setting unit sets the priorities on the basis of an operation of the user to the electronic device.

(12)

The information processing apparatus according to any one of (1) to (11) above, in which the channel is an unused channel that is not used for television broadcasting.

(13)

An information processing method including the steps of:

assigning a predetermined channel of a television receiver to predetermined specific information;

associating at least one content specified by a predetermined electronic device or a predetermined user with the specific information;

receiving a request for the content associated with the specific information from the television receiver in response to a selection of the channel in the television receiver; and controlling the content to be distributed to the television receiver in response to the request.

(14)

A receiving apparatus including:

a selection receiving unit configured to receive a selection of a predetermined channel to which predetermined specific information is assigned by a predetermined information processing apparatus;

a transmitting unit configured to transmit a request for at least one content specified by a predetermined electronic device or a predetermined user, the content being associated with the specific information by the information processing apparatus, to the information processing apparatus in response to the selection of the channel; and a receiving unit configured to receive the content distributed in response to the request.

(15)

The receiving apparatus according to (14) above, further including:

an EPG (Electronic Program Guide) data generation unit configured to generate EPG data for displaying an EPG including display information indicating that the content is distributed in the channel.

(16)

The receiving apparatus according to (15) above, in which in a case where a plurality of the contents are distributed, the EPG data generation unit generates the EPG data for displaying side by side the display information of the plurality of distributed contents in a predetermined order in a direction indicating a time axis in the EPG.

(17)

The receiving apparatus according to (16) above, in which the predetermined order is an order of time at which the contents are specified by the electronic device.

(18)

The receiving apparatus according to (16) above, in which the predetermined order is priorities set on the basis of an operation of the user of the electronic device that specifies the content.

(19)

The receiving apparatus according to (16) above, in which the predetermined order is a descending order of intensity of preference of the user of the electronic device that specifies the content or an order based on a reproduction time of the content.

(20)

A receiving method including the steps of:

receiving a selection of a predetermined channel to which predetermined specific information is assigned by a predetermined information processing apparatus;

a transmitting unit configured to transmit a request for at least one content specified by a predetermined electronic device or a predetermined user, the content being associated with the specific information by the information processing apparatus, to the information processing apparatus in response to the selection of the channel; and receiving the content distributed in response to the request.

REFERENCE SIGNS LIST

11 Mobile device, 12 Server, 13 Television receiver, 14 Remote commander, 31 Communication unit, Assignment unit, 33 Association unit, 34 Distribution unit, 35 Setting unit, 51 Selection receiving unit, 52 Transmitting unit, 53 Television broadcast receiving unit, 54 Content receiving unit, 55 EPG data generation unit, 56 Display unit

The invention claimed is:

1. An information processing apparatus comprising:
an assignment unit configured to assign a predetermined channel of a television receiver to predetermined specific information;
an association unit configured to associate at least one content specified by a predetermined electronic device with the specific information and to associate the specific information with an ID that identifies the electronic device;
a receiving unit configured to receive a request for the content associated with the specific information from the television receiver in response to a selection of the channel in the television receiver; and
a distribution control unit configured to control the content to be distributed to the television receiver in response to the request.

2. The information processing apparatus according to claim 1, wherein
the assignment unit assigns the different channels to respective pieces of the specific information, and
the association unit associates the respective pieces of the specific information with the contents for each class of the contents.

3. The information processing apparatus according to claim 2, wherein
the class of the content is a kind of medium.

4. The information processing apparatus according to claim 2, wherein
the class of the content is a category of the content or an intensity of a preference of the user of the electronic device that specifies the content.

5. The information processing apparatus according to claim 2, wherein
the association unit associates the content specified by the electronic device with the specific information in response to acquisition of information displayed on a display unit of the television receiver by the electronic device.

6. The information processing apparatus according to claim 5, wherein
the information displayed on the display unit includes channel information indicating the channel assigned to the specific information, and
in response to the acquisition of the channel information by the electronic device, the association unit associates the specific information assigned to the channel indicated by the channel information with the content for each class of the content.

7. The information processing apparatus according to claim 1, wherein
in a case where a plurality of the contents and the specific information are associated with each other, the distribution control unit controls the plurality of contents to be sequentially distributed to the television receiver in a predetermined order in response to the request.

8. The information processing apparatus according to claim 7, wherein
the distribution control unit controls the plurality of contents to be sequentially distributed to the television receiver in an order of time at which the contents are specified by the electronic device.

9. The information processing apparatus according to claim 7, further comprising:
a setting unit configured to set priorities of the distribution of the plurality of contents specified by the electronic device, wherein
in accordance with the set priorities, the distribution control unit controls the plurality of contents to be sequentially distributed to the television receiver.

10. The information processing apparatus according to claim 9, wherein
the setting unit sets the priorities on a basis of an operation of the user to the electronic device.

11. The information processing apparatus according to claim 1, wherein
the channel is an unused channel that is not used for television broadcasting.

12. An information processing method comprising the steps of:
- assigning a predetermined channel of a television receiver to predetermined specific information;
- associating at least one content specified by a predetermined electronic device or a predetermined user with the specific information;
- associating the specific information with an ID that identifies the electronic device;
- receiving a request for the content associated with the specific information from the television receiver in response to a selection of the channel in the television receiver; and
- controlling the content to be distributed to the television receiver in response to the request.

13. A receiving apparatus comprising:
- a selection receiving unit configured to receive a selection of a predetermined channel to which predetermined specific information is assigned by a predetermined information processing apparatus;
- a transmitting unit configured to transmit a request for at least one content specified by a predetermined electronic device or a predetermined user, the content being associated by the information processing apparatus with an ID that identifies the electronic device, to the information processing apparatus in response to the selection of the channel; and
- a receiving unit configured to receive the content distributed in response to the request.

14. The receiving apparatus according to claim 13, further comprising:
- an EPG (Electronic Program Guide) data generation unit configured to generate EPG data for displaying an EPG including display information indicating that the content is distributed in the channel.

15. The receiving apparatus according to claim 14, wherein
- in a case where a plurality of the contents are distributed, the EPG data generation unit generates the EPG data for displaying side by side the display information of the plurality of distributed contents in a predetermined order in a direction indicating a time axis in the EPG.

16. The receiving apparatus according to claim 15, wherein
- the predetermined order is an order of time at which the contents are specified by the electronic device.

17. The receiving apparatus according to claim 15, wherein
- the predetermined order is priorities set on a basis of an operation of the user of the electronic device that specifies the content.

18. The receiving apparatus according to claim 15, wherein
- the predetermined order is a descending order of intensity of preference of the user of the electronic device that specifies the content or an order based on a reproduction time of the content.

19. A receiving method comprising the steps of:
- receiving a selection of a predetermined channel to which predetermined specific information is assigned by a predetermined information processing apparatus;
- a transmitting unit configured to transmit a request for at least one content specified by a predetermined electronic device or a predetermined user, the content being associated by the information processing apparatus with an ID that identifies the electronic device, to the information processing apparatus in response to the selection of the channel; and
- receiving the content distributed in response to the request.

20. An information processing apparatus comprising:
- at least one processor configured to load a program stored on non-transitory storage media, the program causing the at least one processor to:
    - associate at least one content specified by a predetermined electronic device with the specific information and to associate the specific information with an ID that identifies the electronic device,
    - receive a request for the content associated with the specific information from the television receiver in response to a selection of the channel in the television receiver,
    - control the content to be distributed to the television receiver in response to the request; and
- a display that displays the ID that identifies the electronic device.

* * * * *